US012701539B2

(12) United States Patent
Shreevastav et al.

(10) Patent No.: US 12,701,539 B2
(45) Date of Patent: Aug. 4, 2026

(54) POSITIONING REFERENCE SIGNAL TRANSMISSION AND MEASUREMENT IN A WIRELESS COMMUNICATION NETWORK

(71) Applicant: Telefonaktiebolaget LM Ericsson (publ), Stockholm (SE)

(72) Inventors: Ritesh Shreevastav, Upplands Väsby (SE); Yazid Lyazidi, London (GB); Florent Munier, Västra Frölunda (SE); Muhammad Ali Kazmi, Sundbyberg (SE); Venkatarao Gonuguntla, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 310 days.

(21) Appl. No.: 18/697,250

(22) PCT Filed: Sep. 28, 2022

(86) PCT No.: PCT/SE2022/050860
§ 371 (c)(1),
(2) Date: Mar. 29, 2024

(87) PCT Pub. No.: WO2023/055275
PCT Pub. Date: Apr. 6, 2023

(65) Prior Publication Data
US 2024/0406923 A1     Dec. 5, 2024

(30) Foreign Application Priority Data
Oct. 1, 2021     (IN) .............................. 202141044695

(51) Int. Cl.
*H04W 64/00*        (2009.01)
*H04L 5/00*         (2006.01)
*H04W 74/0816*      (2024.01)

(52) U.S. Cl.
CPC ......... *H04W 64/003* (2013.01); *H04L 5/0051* (2013.01); *H04W 74/0816* (2013.01)

(58) Field of Classification Search
CPC ........... H04W 64/003; H04W 74/0816; H04W 64/00; H04L 5/0051; H04L 5/0078; H04L 5/0048; G01S 5/0226; G01S 5/0236
See application file for complete search history.

(56) References Cited

U.S. PATENT DOCUMENTS

2020/0021409 A1 *   1/2020   Kumar .............. H04W 72/0453

FOREIGN PATENT DOCUMENTS

WO      WO-2020061944 A1 *  4/2020   ........... H04L 5/0048
WO      WO-2020167890 A1 *  8/2020   ........... H04W 24/10
WO      WO-2021092072 A1 *  5/2021   ........... H04L 5/0051

OTHER PUBLICATIONS

3GPP, "3rd Generation Partnership Project; Technical Specification Group Radio Access Network; NR; Physical layer procedures for data (Release 16)", 3GPP TS 38.214 V16.6.0, Jun. 2021, 172 pages.
(Continued)

*Primary Examiner* — Ankur Jain
(74) *Attorney, Agent, or Firm* — Murphy, Bilak & Homiller, PLLC

(57)        ABSTRACT

A radio network node (14) is configured for use in a wireless communication network (10). The radio network node (14) transmits, to a location server, signaling (18) indicating one or more time occasions (22) reserved by the radio network node (14) for positioning reference signal, PRS, transmission (16). In some embodiments, the radio network node (14) performs PRS transmission (16) in the one or more time occasions (22) indicated. The radio network node (14) may correspondingly refrain from scheduling any transmission other than PRS transmission (16) in the one or more time occasions (22) indicated as reserved for PRS transmission (16), or drop any transmission other than PRS transmission (16) scheduled for transmission in the one or more time occasions (22) indicated as reserved for PRS transmission (16).

16 Claims, 14 Drawing Sheets

(56)                    References Cited

OTHER PUBLICATIONS

Intel Corporation, et al., "Revised WID on NR Positioning Enhancements", 3GPP TSG RAN Meeting #91e, RP-210628, Electronic Meeting, Revised from RP-202900, Mar. 16-26, 2022, 1-7.

3GPP, "3GPP TS 38.455 V16.3.0", 3rd Generation Partnership Project; Technical Specification Group Radio Access Network; NG-RAN; NR Positioning Protocol A (NRPPa) (Release 16), Apr. 2021, 1-151.

3GPP, "3rd Generation Partnership Project; Technical Specification Group Radio Access Network; LTE Positioning Protocol (LPP) (Release 16)", 3GPP TS 37.355 V16.3.0, 2020-12, 1-298.

Catt, "Discussion on latency improvements for both DL and DL+UL positioning methods", 3GPP TSG RAN WG1 Meeting #105-e, R1-2104523, e-Meeting, May 19-May 27, 2021, 1-7.

Ericsson, "(TP for NRPPa BL CR on Positioning) Support of latency improvement for PRS measurement with MG", 3GPP TSG-RAN WG3 Meeting #114bis-e, R3-220456, Online, Jan. 17-26, 2022, 1-8.

Ericsson, "Discussion on the received LS on PRS measurement outside the measurement gap", 3GPP TSG-RAN3 Meeting #114-e, R3-215434, Nov. 1-11, 2021, 1-4.

Ericsson, "Introduction of NR Positioning enhancements to NRPPa", 3GPP TSG-RAN WG3 Meeting #113-e, R3-214516, Online, Aug. 16-26, 2021, 1-70.

Ericsson, "TP to NRPPa BL CR: Addition of On-demand DL-PRS information", 3GPP TSG-RAN WG3 #113-e, R3-213854, Online, Aug. 16-26, 2021, 1-7.

Vivo, "Discussion on potential positioning enhancements", 3GPP TSG RAN WG1 #103-e, R1-2007666, e-Meeting, Oct. 26-Nov. 13, 2020, 1-50.

* cited by examiner

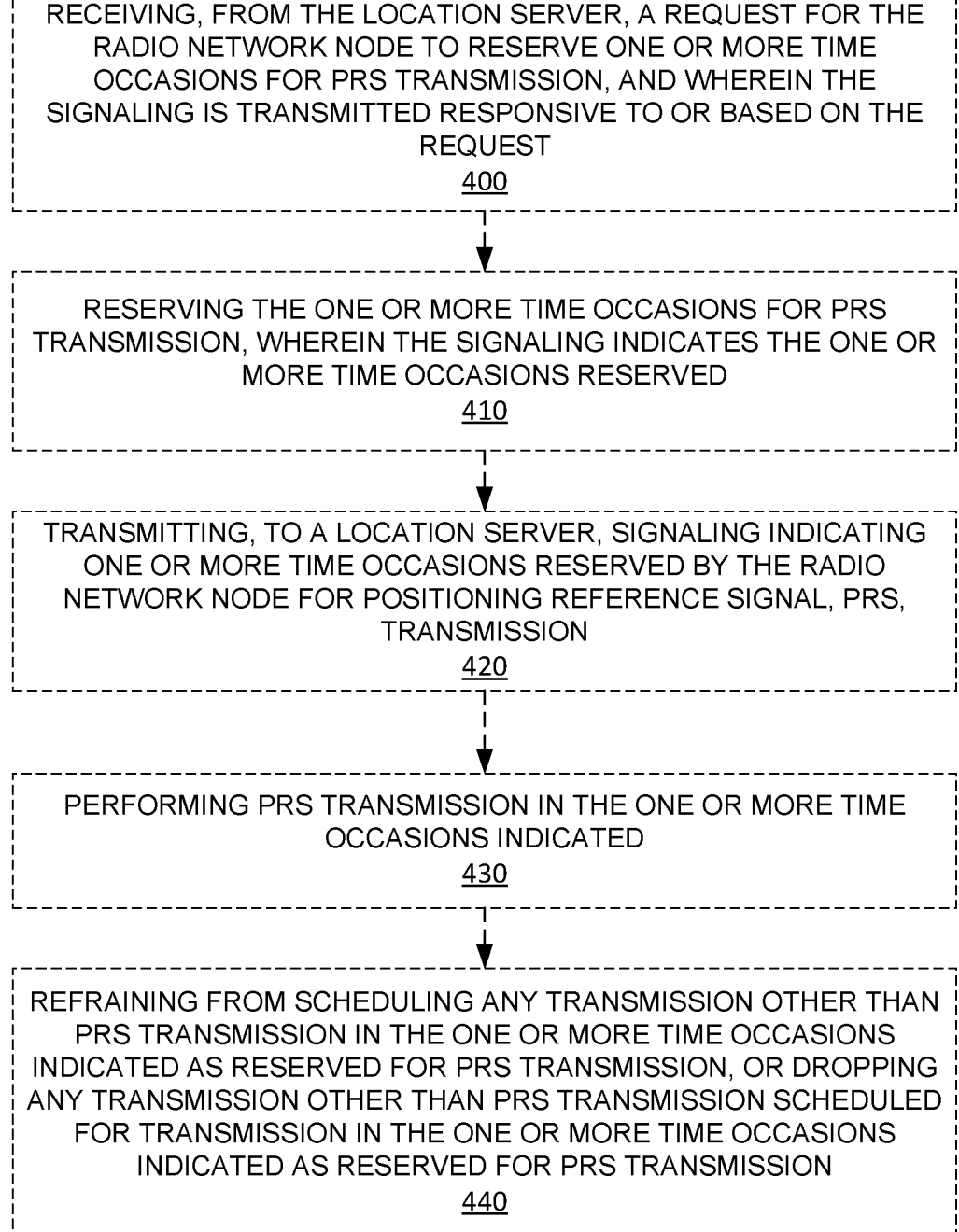

RECEIVING, FROM THE LOCATION SERVER, A REQUEST FOR THE RADIO NETWORK NODE TO RESERVE ONE OR MORE TIME OCCASIONS FOR PRS TRANSMISSION, AND WHEREIN THE SIGNALING IS TRANSMITTED RESPONSIVE TO OR BASED ON THE REQUEST
400

RESERVING THE ONE OR MORE TIME OCCASIONS FOR PRS TRANSMISSION, WHEREIN THE SIGNALING INDICATES THE ONE OR MORE TIME OCCASIONS RESERVED
410

TRANSMITTING, TO A LOCATION SERVER, SIGNALING INDICATING ONE OR MORE TIME OCCASIONS RESERVED BY THE RADIO NETWORK NODE FOR POSITIONING REFERENCE SIGNAL, PRS, TRANSMISSION
420

PERFORMING PRS TRANSMISSION IN THE ONE OR MORE TIME OCCASIONS INDICATED
430

REFRAINING FROM SCHEDULING ANY TRANSMISSION OTHER THAN PRS TRANSMISSION IN THE ONE OR MORE TIME OCCASIONS INDICATED AS RESERVED FOR PRS TRANSMISSION, OR DROPPING ANY TRANSMISSION OTHER THAN PRS TRANSMISSION SCHEDULED FOR TRANSMISSION IN THE ONE OR MORE TIME OCCASIONS INDICATED AS RESERVED FOR PRS TRANSMISSION
440

FIG. 4

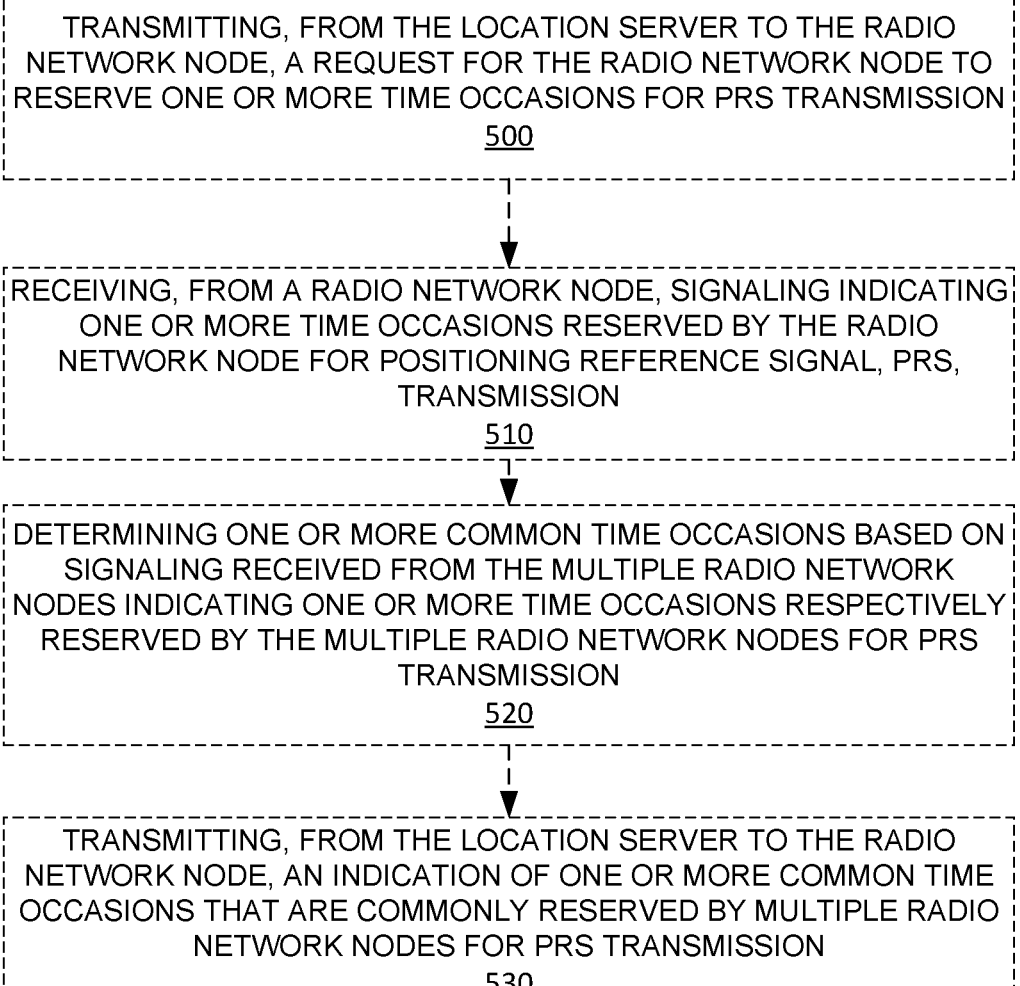

TRANSMITTING, FROM THE LOCATION SERVER TO THE RADIO NETWORK NODE, A REQUEST FOR THE RADIO NETWORK NODE TO RESERVE ONE OR MORE TIME OCCASIONS FOR PRS TRANSMISSION
500

RECEIVING, FROM A RADIO NETWORK NODE, SIGNALING INDICATING ONE OR MORE TIME OCCASIONS RESERVED BY THE RADIO NETWORK NODE FOR POSITIONING REFERENCE SIGNAL, PRS, TRANSMISSION
510

DETERMINING ONE OR MORE COMMON TIME OCCASIONS BASED ON SIGNALING RECEIVED FROM THE MULTIPLE RADIO NETWORK NODES INDICATING ONE OR MORE TIME OCCASIONS RESPECTIVELY RESERVED BY THE MULTIPLE RADIO NETWORK NODES FOR PRS TRANSMISSION
520

TRANSMITTING, FROM THE LOCATION SERVER TO THE RADIO NETWORK NODE, AN INDICATION OF ONE OR MORE COMMON TIME OCCASIONS THAT ARE COMMONLY RESERVED BY MULTIPLE RADIO NETWORK NODES FOR PRS TRANSMISSION
530

FIG. 5

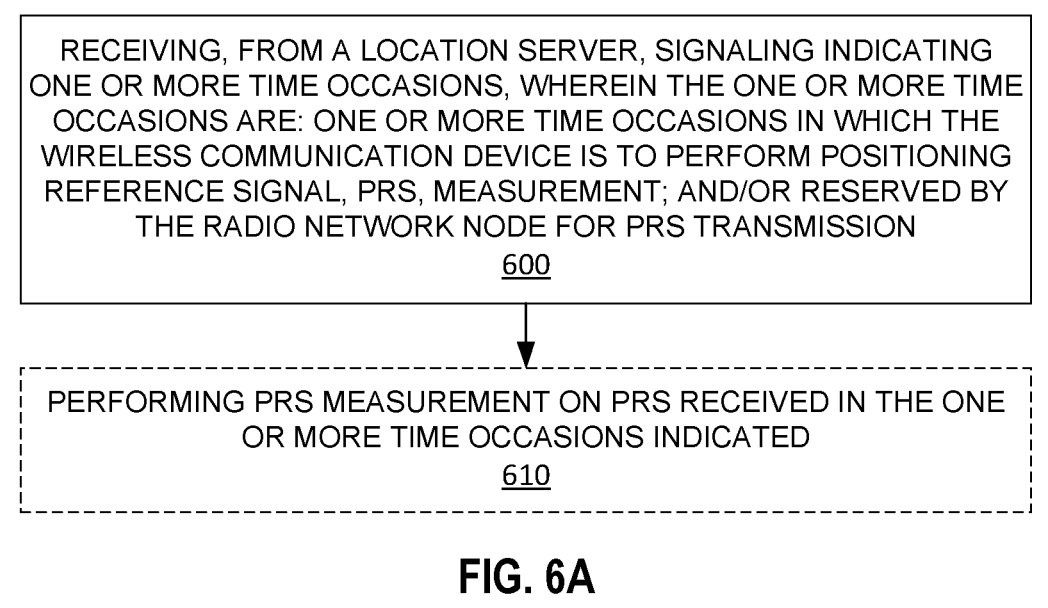

RECEIVING, FROM A LOCATION SERVER, SIGNALING INDICATING ONE OR MORE TIME OCCASIONS, WHEREIN THE ONE OR MORE TIME OCCASIONS ARE: ONE OR MORE TIME OCCASIONS IN WHICH THE WIRELESS COMMUNICATION DEVICE IS TO PERFORM POSITIONING REFERENCE SIGNAL, PRS, MEASUREMENT; AND/OR RESERVED BY THE RADIO NETWORK NODE FOR PRS TRANSMISSION
600

PERFORMING PRS MEASUREMENT ON PRS RECEIVED IN THE ONE OR MORE TIME OCCASIONS INDICATED
610

FIG. 6A

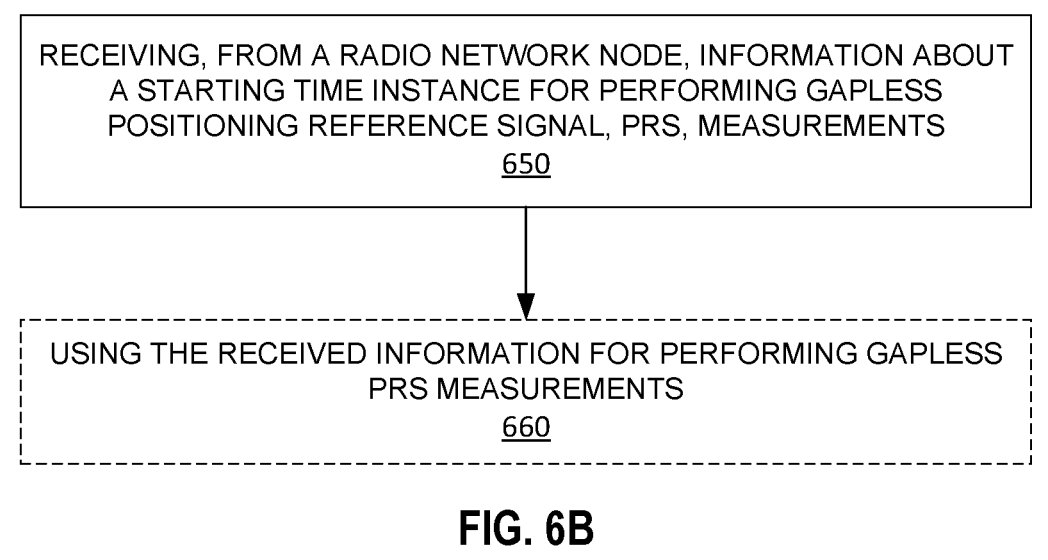

RECEIVING, FROM A RADIO NETWORK NODE, INFORMATION ABOUT A STARTING TIME INSTANCE FOR PERFORMING GAPLESS POSITIONING REFERENCE SIGNAL, PRS, MEASUREMENTS
650

USING THE RECEIVED INFORMATION FOR PERFORMING GAPLESS PRS MEASUREMENTS
660

FIG. 6B

COMMUNICATION SYSTEM
1000

HOST
1016

TELECOMMUNICATION NETWORK
1002

CORE NETWORK
1006

CORE NETWORK
NODE
1008

ACCESS NETWORK
1004

NETWORK NODE
1010A

NETWORK NODE
1010B

UE
1012A

UE
1012B

HUB
1014

UE
1012C

UE
1012D

POSITIONING REFERENCE SIGNAL TRANSMISSION AND MEASUREMENT IN A WIRELESS COMMUNICATION NETWORK

TECHNICAL FIELD

The present application relates generally to a wireless communication network, and relates more particularly to positioning reference signal transmission and measurement in such a network.

BACKGROUND

Upon reception of a positioning reference signal (PRS) measurement request, a wireless communication device is expected to measure high priority PRS for X ms starting from the Y subframe after receiving the request.

Gapless measurements introduce a PRS processing window where the wireless communication device processes only PRS measurements and cannot process any other downlink data or channel. For gapless PRS measurements, this can introduce unwanted behavior of the wireless communication device dropping ongoing priority data reception in favor of processing PRS measurements. This can be particularly problematic if the wireless communication device is in the middle of a high priority data reception.

To avoid this, a radio network node may send a priority data indication to the wireless communication device. However, when the PRS measurements are dropped in favor of downlink data, the location server heretofore does not know about the PRS measurements dropping until the measurement response time is completed. The location server can request a fresh measurement only after the response time; this causes network latency in getting the PRS measurements.

Even for PRS measurements outside the gap, the radio network node may prioritize data over PRS transmission. This can lead to larger latency in getting the location measurement from the wireless communication device.

SUMMARY

Some embodiments herein enable hand-shaking between a location server and a radio network node in order to guarantee that positioning reference signal (PRS) resources are not dropped during a certain time. This time could coincide with a measurement gap when a wireless communication device is configured to perform PRS measurements within a measurement gap. Or, when the wireless communication device is capable of performing gapless PRS measurements and is configured with such gapless PRS measurements, this time could coincide with a so-called PRS processing window during which the wireless communication device is expected to prioritize PRS over data. The measurement gap and PRS processing window can generally be referred to as a "measurement occasion" or "PRS measurement occasion". The hand-shaking between the location server and the radio network node can in some embodiments be done via a new dynamic indication from the location server to the radio network node, and from the radio network node to the location server. This new dynamic indication may indicate which PRS resources have been maintained and/or dropped. Or, in other embodiments, the dynamic indication may indicate which PRS resources will be maintained only for a certain time duration (i.e., measurement occasion) before being dropped completely based on scheduling information at the radio network node.

More particularly, embodiments herein include a radio network node configured for use in a wireless communication network. The radio network node transmits, to a location server, signaling indicating one or more time occasions reserved by the radio network node for positioning reference signal, PRS, transmission. In some embodiments, the radio network node performs PRS transmission in the one or more time occasions indicated. The radio network node may correspondingly refrain from scheduling any transmission other than PRS transmission in the one or more time occasions indicated as reserved for PRS transmission, or drop any transmission other than PRS transmission scheduled for transmission in the one or more time occasions indicated as reserved for PRS transmission.

More particularly, embodiments herein include a method performed by a radio network node configured for use in a wireless communication network. The method comprises transmitting, to a network node, signaling indicating one or more time occasions reserved by the radio network node for positioning reference signal, PRS, transmission.

In some embodiments, the method further comprises reserving the one or more time occasions for PRS transmission. In some embodiments, the signaling indicates the one or more time occasions reserved. In this case, the method further comprises performing PRS transmission in the one or more time occasions indicated.

In some embodiments, the method further comprises receiving, from the network node, a request for the radio network node to reserve one or more time occasions for PRS transmission.

In some embodiments, the signaling is transmitted responsive to or based on the request. In some embodiments, at least one of the one or more time occasions indicated as reserved by the signaling is the same as at least one of the one or more time occasions requested by the network node to be reserved. In some embodiments, the signaling indicates one or more time occasions reserved by the radio network node for PRS transmission by indicating acceptance of the request.

In some embodiments, the method further comprises refraining from scheduling any transmission other than PRS transmission in the one or more time occasions indicated as reserved for PRS transmission, or dropping any transmission other than PRS transmission scheduled for transmission in the one or more time occasions indicated as reserved for PRS transmission.

In some embodiments, the method further comprises, after transmitting the signaling, receiving, from the network node, an indication of one or more common time occasions that are commonly reserved by multiple radio network nodes for PRS transmission. In this case, the method further comprises refraining from scheduling any transmission other than PRS transmission in the one or more common time occasions, or dropping any transmission other than PRS transmission scheduled for transmission in the one or more common time occasions. In this case, the method further comprises performing PRS transmission in the one or more common time occasions.

In some embodiments, the signaling indicates one or more time occasions unconditionally reserved by the radio network node for PRS transmission, such that PRS transmission in the one or more time occasions is guaranteed. In other embodiments, the signaling alternatively indicates one or more time occasions reserved by the radio network node for PRS transmission subject to PRS transmission having at least as high of priority as any other transmissions contending for transmission in the one or more time occasions.

In some embodiments, the one or more time occasions are included in a time window within which PRS transmission by the radio network node is guaranteed or are included in a minimum time window within which PRS transmission by the radio network node is guaranteed.

In some embodiments, the network node is a location server.

In some embodiments, a split radio network node comprises a distributed unit and a central unit. In some embodiments, the radio network node implements the distributed unit and wherein the network node implements the central unit.

Other embodiments herein include a method performed by a network node configured for use in a wireless communication network. The method comprises receiving, from a radio network node, signaling indicating one or more time occasions reserved by the radio network node for positioning reference signal, PRS, transmission.

In some embodiments, the method further comprises transmitting, from the network node to the radio network node, a request for the radio network node to reserve one or more time occasions for PRS transmission. In some embodiments, the signaling is received responsive to or based on the request, and at least one of the one or more time occasions indicated as reserved by the signaling is the same as at least one of the one or more time occasions requested by the network node to be reserved. In some embodiments, the signaling indicates one or more time occasions reserved by the radio network node for PRS transmission by indicating acceptance of the request.

In some embodiments, the method further comprises determining, based on signaling received from multiple radio network nodes indicating one or more time occasions respectively reserved by the multiple radio network nodes for PRS transmission, one or more common time occasions that are commonly reserved by the multiple radio network nodes for PRS transmission. In this case, the method further comprises, after receiving the signaling from the radio network node, transmitting, from the network node to the radio network node, an indication of the one or more common time occasions that are commonly reserved by the multiple radio network nodes for PRS transmission.

In some embodiments, the signaling indicates one or more time occasions unconditionally reserved by the radio network node for PRS transmission, such that PRS transmission in the one or more time occasions is guaranteed. In other embodiments, the signaling alternatively indicates one or more time occasions reserved by the radio network node for PRS transmission subject to PRS transmission having at least as high of priority as any other transmissions contending for transmission in the one or more time occasions.

In some embodiments, the one or more time occasions are included in a time window within which PRS transmission by the radio network node is guaranteed or are included in a minimum time window within which PRS transmission by the radio network node is guaranteed.

In some embodiments, the method further comprises, based on the signaling, avoiding scheduling gapless PRS measurements during a downlink priority data occasion, wherein the downlink priority data occasion is an occasion during which is scheduled downlink data that has a higher priority than PRS transmission.

In some embodiments, the network node is a location server.

In some embodiments, a split radio network node comprises a distributed unit and a central unit. In some embodiments, the radio network node implements the distributed unit and the network node implements the central unit.

Other embodiments herein include a method performed by a wireless communication device configured for use in a wireless communication network. The method comprises receiving, from a radio network node, information about a starting time instance for performing gapless positioning reference signal, PRS, measurements.

In some embodiments, the method further comprises using the received information for performing gapless PRS measurements.

In some embodiments, the information expresses the starting time instance in terms of a system frame number, a subframe number, and a slot number.

In some embodiments, the information is information about a starting time instance of a time window within which PRS transmission by the radio network node is guaranteed.

Other embodiments herein include a radio network node configured for use in a wireless communication network. The radio network node is configured to transmit, to a network node, signaling indicating one or more time occasions reserved by the radio network node for positioning reference signal, PRS, transmission.

In some embodiments, the radio network node is configured to perform the steps described above for a radio network node configured for use in a wireless communication network.

Other embodiments herein include a network node configured for use in a wireless communication network. The network node is configured to receive, from a radio network node, signaling indicating one or more time occasions reserved by the radio network node for positioning reference signal, PRS, transmission.

In some embodiments, the network node is configured to perform the steps described above for a network node configured for use in a wireless communication network.

Other embodiments herein include a wireless communication device configured for use in a wireless communication network. The wireless communication device is configured to receive, from a radio network node, information about a starting time instance for performing gapless positioning reference signal, PRS, measurements.

In some embodiments, the wireless communication device is configured to perform the steps described above for a wireless communication device configured for use in a wireless communication network.

Other embodiments herein include a computer program comprising instructions which, when executed by at least one processor of a radio network node, causes the radio network node to perform the steps described above for a radio network node configured for use in a wireless communication network. Other embodiments herein include a computer program comprising instructions which, when executed by at least one processor of a network node, causes the network node to perform the steps described above for a network node configured for use in a wireless communication network. Other embodiments herein include a computer program comprising instructions which, when executed by at least one processor of a wireless communication device, causes the wireless communication device to perform the steps described above for a wireless communication device configured for use in a wireless communication network. In some embodiments, a carrier containing the computer program is one of an electronic signal, optical signal, radio signal, or computer readable storage medium.

Other embodiments herein include a radio network node configured for use in a wireless communication network. The radio network node comprises communication circuitry and processing circuitry. The processing circuitry is configured to transmit, to a network node, via the communication circuitry, signaling indicating one or more time occasions reserved by the radio network node for positioning reference signal, PRS, transmission.

In some embodiments, the processing circuitry is configured to perform the steps described above for a radio network node configured for use in a wireless communication network.

Other embodiments herein include a network node configured for use in a wireless communication network. The network node comprises communication circuitry and processing circuitry. The processing circuitry is configured to receive, from a radio network node, via the communication circuitry, signaling indicating one or more time occasions reserved by the radio network node for positioning reference signal, PRS, transmission.

In some embodiments, the processing circuitry is configured to perform the steps described above for a network node configured for use in a wireless communication network.

Other embodiments herein include a wireless communication device configured for use in a wireless communication network. The wireless communication device comprises communication circuitry and processing circuitry. The processing circuitry is configured to receive, from a radio network node, via the communication circuitry, information about a starting time instance for performing gapless positioning reference signal, PRS, measurements.

In some embodiments, the processing circuitry is configured to perform the steps described above for a wireless communication device configured for use in a wireless communication network.

BRIEF DESCRIPTION OF THE DRAWINGS

FIG. 4 is a logic flow diagram of a method performed by a radio network node according to some embodiments.

FIG. 5 is a logic flow diagram of a method performed by a location server according to some embodiments.

FIG. 6A is a logic flow diagram of a method performed by a wireless communication device according to some embodiments.

FIG. 6B is a logic flow diagram of a method performed by a wireless communication device according to some embodiments.

6

Figure 14:
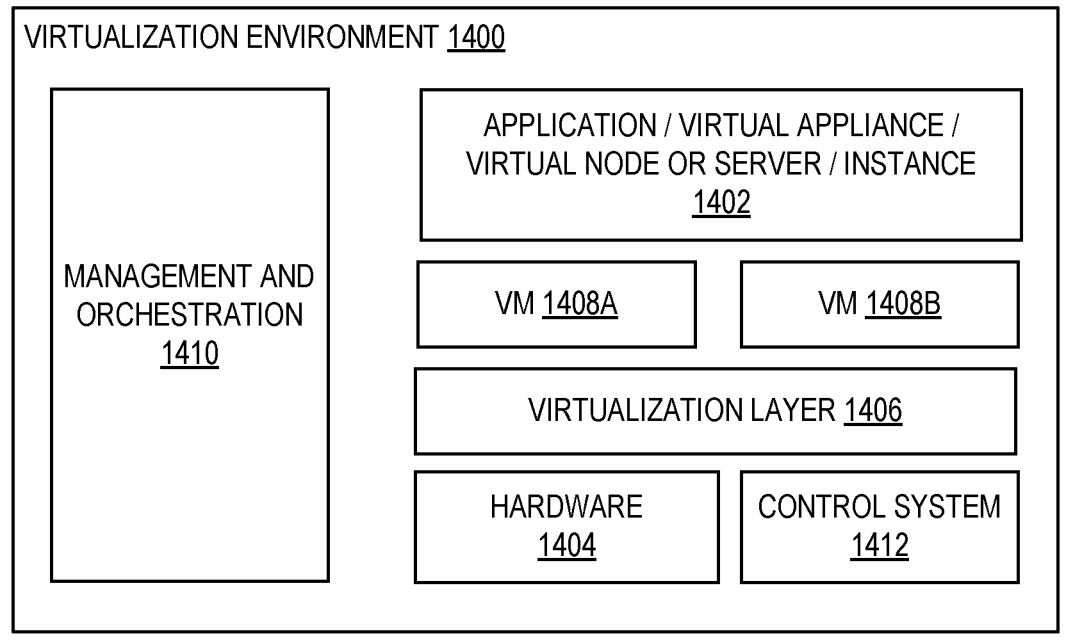

FIG. 14 is a block diagram of a virtualization environment according to some embodiments.

Figure 15:
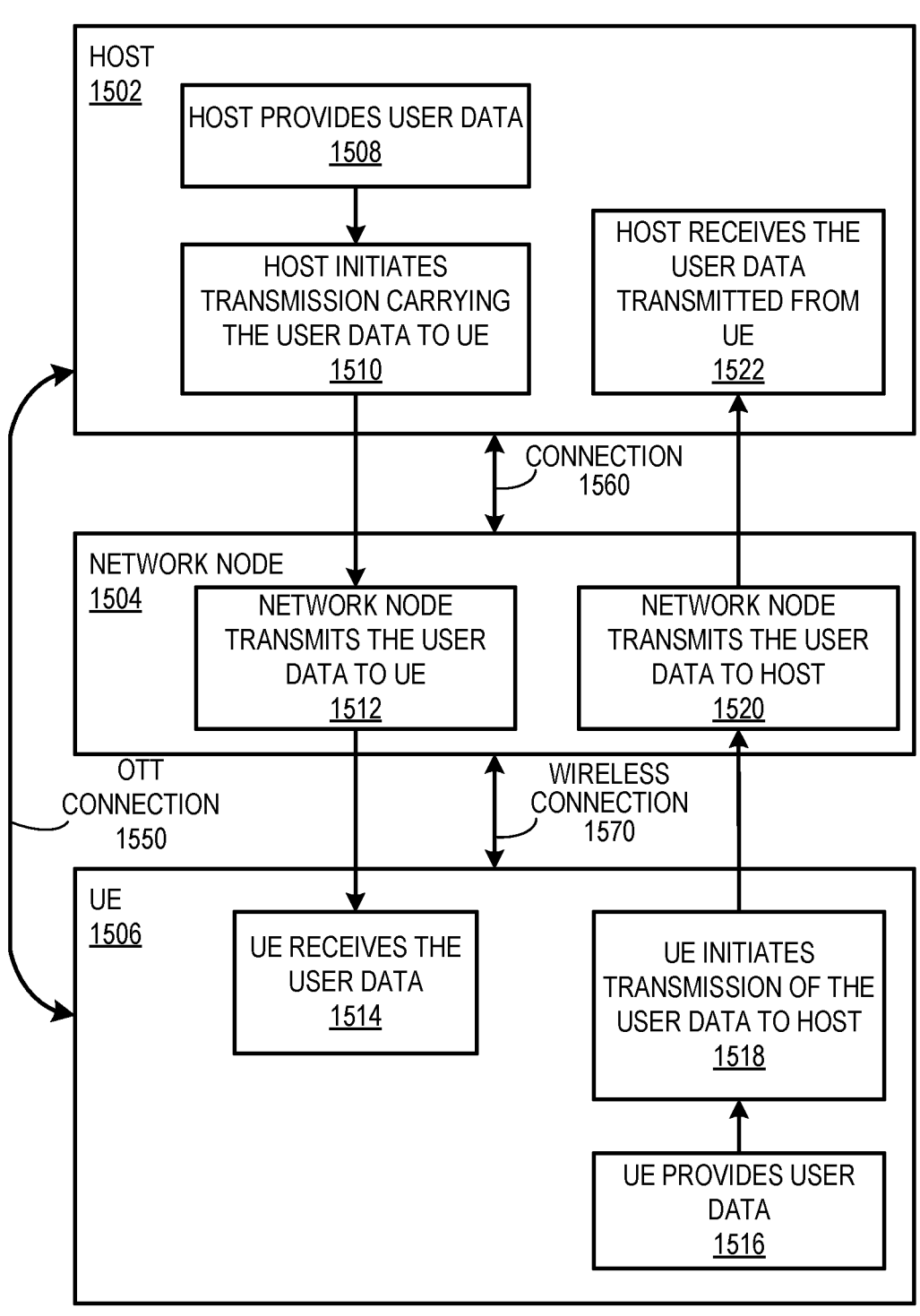

FIG. 15 is a block diagram of a host communicating via a network node with a UE over a partially wireless connection in accordance with some embodiments.

DETAILED DESCRIPTION

Figure 1:
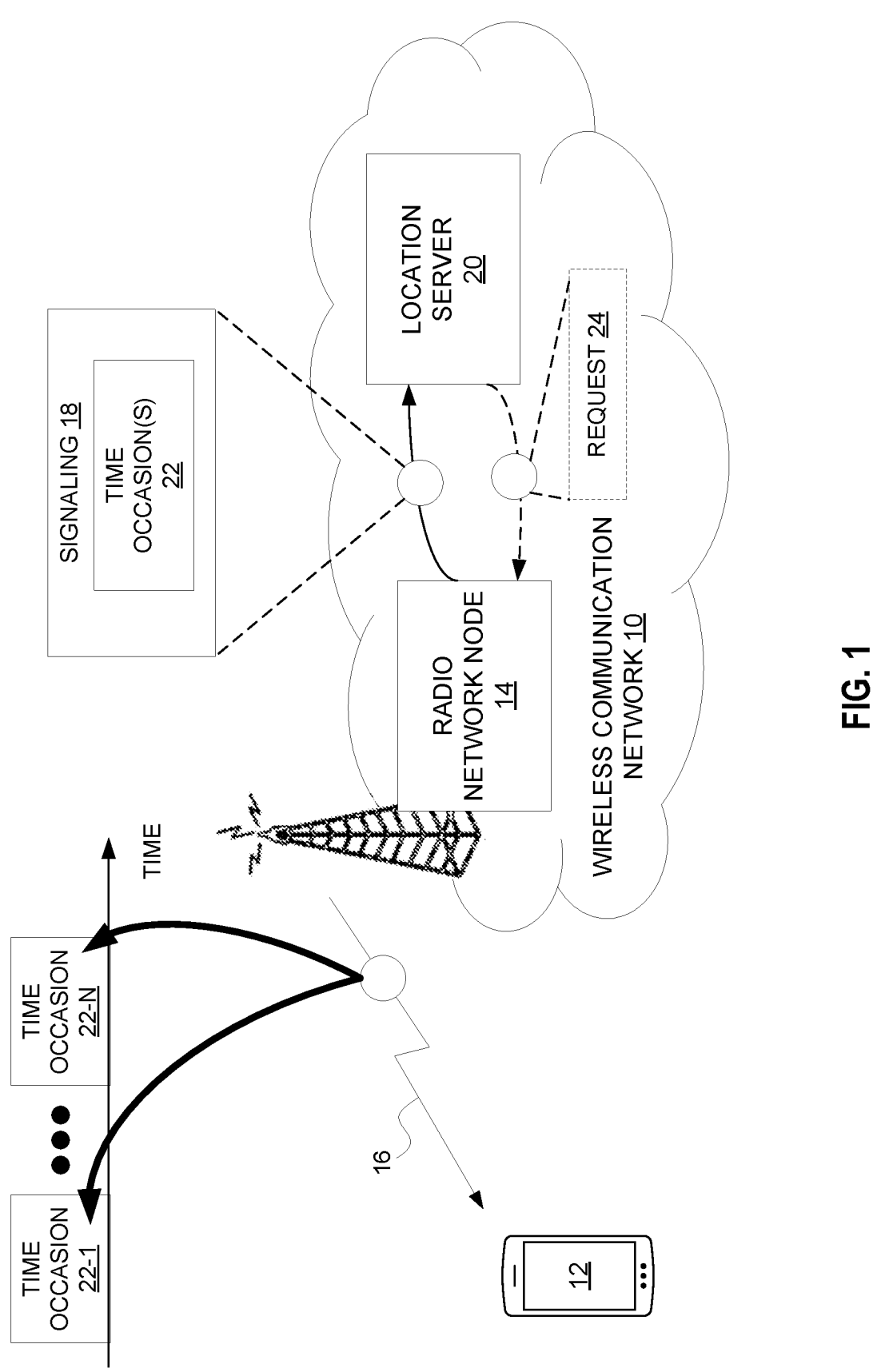
FIG. 1 is a block diagram of a wireless communication network according to some embodiments.

FIG. 1 shows a wireless communication network 10 according to some embodiments, e.g., in the form of a 5G network. The wireless communication network 10 provides wireless communication service to a wireless communication device 12, e.g., a user equipment (UE). A radio network node 14 in the network 10 is configured to perform positioning reference signal (PRS) transmission 16, to facilitate determining the position of the wireless communication device 12. PRS transmission 16 is the transmission of downlink PRS. PRS as used herein refers to any downlink reference signal usable for positioning of the wireless communication device 12. In some embodiments, though, PRS refers to a downlink reference signal dedicated for or otherwise specifically configured for positioning of the wireless communication device 12.

According to embodiments herein, the radio network node 14 is configured to transmit signaling 18 to a location server 20, e.g., implementing a Location Management Function (LMF) in a 5G network. The signaling 18 indicates one or more time occasions 22, shown specifically as time occasions 22-1 . . . 22-N. The time occasion(s) 22 indicated are time occasions that are reserved by the radio network node 14 for PRS transmission 16. The time occasion(s) 22 may be any occasions in time, at any granularity. The time occasion(s) 22 may for example comprise one or more PRS resources as used herein, or may comprise one or more sets of PRS resources as used herein. Regardless, the signaling 18 in some embodiments includes a bitmap comprising bits that are respectively associated with time occasions 22, where values of the bits respectively indicate whether the associated time occasions 22 are reserved for PRS transmission 16, e.g., a bit value of 1 or 0 for a certain bit may indicate whether or not a certain time occasion 22 is reserved for PRS transmission 16.

In some embodiments, reservation of the time occasion(s) 22 for PRS transmission 16 is unconditional, e.g., at least in the sense that no higher priority transmission will preempt use of the time occasion(s) 22 for PRS transmission 16. In these and other embodiments, then, the signaling 18 effectively indicates that PRS transmission 16 is guaranteed in the indicated time occasion(s) 22, e.g., the one or more time occasions 22 are included in a (minimum) time window within which PRS transmission 16 by the radio network node 14 is guaranteed.

In other embodiments, though, reservation of the time occasion(s) 22 for PRS transmission 16 is conditional. For example, in one embodiment, the signaling 18 indicates one or more time occasions 22 reserved by the radio network node 14 for PRS transmission 16 subject to PRS transmission 16 having at least as high of priority as any other transmissions contending for transmission in the one or more time occasions 22. In these and other embodiments, then, the signaling 18 may indicate the priority of PRS transmission 16, at least as applied by the radio network node 14.

In some embodiments as shown, the radio network node 14 may transmit the signaling 18 to the location server 20 as a response to, or based on, a request 24. In one embodiment, for example, the request 24 is a request for the radio network node 14 to reserve one or more time occasions for PRS transmission 16. If the radio network node 14 accepts the request fully, the time occasion(s) 22 indicated by the signaling 18 may be the same as the time occasion(s) requested to be reserved. If the radio network node 14 accepts the request only partially, though, the time occasion (s) 22 indicated by the signaling 18 only include some of the time occasion(s) requested to be reserved. In yet other embodiments, the radio network node 14 accepts the request, but nonetheless reserves time occasions other than those requested.

Regardless, having reserved the time occasion(s) 22 for PRS transmission 16, the radio network node 14 may correspondingly perform PRS transmission 16 in the one or more time occasions 22 indicated. Moreover, in some embodiments, the radio network node 14 may refrain from scheduling any transmission other than PRS transmission 16 in the one or more time occasions 22 indicated as reserved for PRS transmission 16. This way, no high priority data transmission (e.g., Physical Downlink Shared Channel, PDSCH, transmission) will interrupt the PRS transmission 16 or measurement thereof. Alternatively, even if the radio network node 14 schedules other transmissions in the one or more time occasions 22, the radio network node 14 may drop any transmission other than PRS transmission 15 scheduled for transmission in the one or more time occasions 22 indicated as reserved for PRS transmission 16. Alternatively or additionally, with the signaling 18 indicating the time occasion(s) 22 reserved for PRS transmission to the location server 20, the location server 20 in some embodiments may avoid scheduling (gapless) PRS measurements during a downlink priority data occasion, i.e., an occasion during which is scheduled downlink data that has a higher priority than PRS transmission.

Although not shown, in some embodiments, the location server 20 may receive signaling similar to signaling 18 from multiple radio network nodes. Based on this signaling, the location server 20 may determine one or more common time occasions that are commonly reserved by multiple radio network nodes for PRS transmission. The location server 20 may then transmit an indication of the common time occasion(s) to the radio network node 14 and/or the wireless communication device 12, e.g., where the common time occasion(s) are included in a common guaranteed PRS measurement window. In this case, the radio network node 14 may correspondingly perform PRS transmission 16 in the one or more common time occasions indicated. Moreover, in some embodiments, the radio network node 14 may refrain from scheduling any transmission other than PRS transmission 16 in the one or more common time occasions. This way, no high priority data transmission (e.g., PDSCH transmission) will interrupt the PRS transmission 16 or measurement thereof. Alternatively, even if the radio network node 14 schedules other transmissions in the one or more common time occasions, the radio network node 14 may drop any transmission other than PRS transmission 16 scheduled for transmission in the one or more common time occasions. Alternatively or additionally, the location server 20 in some embodiments may avoid scheduling (gapless) PRS measurements during a downlink priority data occasion.

Figure 2:
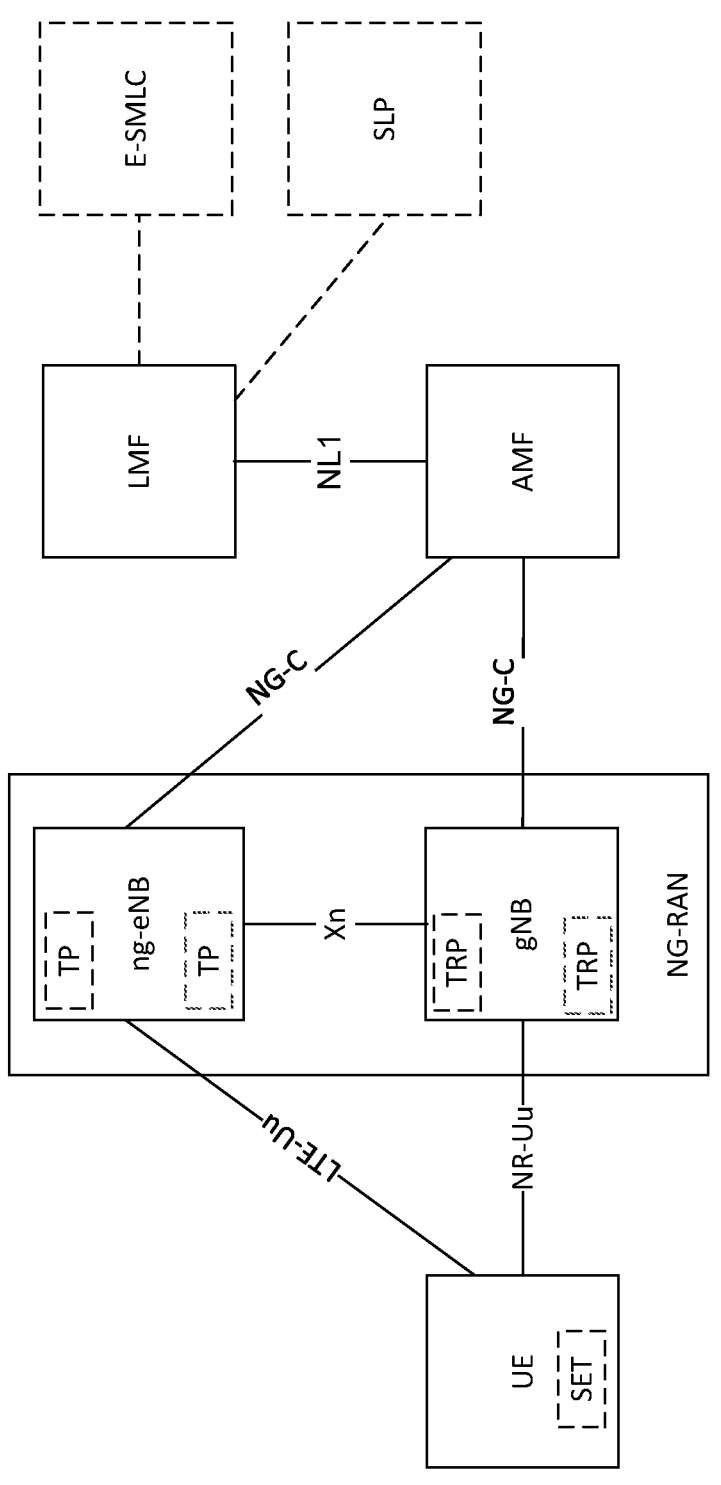
FIG. 2 is a block diagram of a New Radio network architecture according to some embodiments.

Consider now some embodiments as exemplified in a New Radio (NR) network, e.g., by the architecture shown in FIG. 2. In this case, the Location Management Function (LMF) exemplifies the location server 20 in NR, a user equipment (UE) exemplifies the wireless communication device 12, and a gNodeB (gNB) or transmission reception point (TRP) exemplifies the radio network node 14.

In NR, interactions between the location node/server and the gNodeB occur via the NR Positioning Protocol A (NRPPa). The interactions between the gNodeB and the device is supported via the Radio Resource Control (RRC) protocol, while the location node interfaces with the User Equipment (UE) via the LTE Positioning Protocol (LPP). LPP is common to both NR and LTE. It will be appreciated that while FIG. 2 shows both a gNB and an ng-eNB, both may not always be present. Further, when both the gNB and the ng-eNB are present, the NG-C is generally only present for one of them.

DL-PRS Signals:

Some embodiments herein are applicable for PRS in an NR network. In some embodiments, for example, the downlink (DL) positioning reference signal (PRS) is configured by each cell separately, and the location server (i.e., LMF) collects all configuration via the NRPPa protocol, before sending an assistance data (AD) message to the UE via the LPP protocol. The DL-PRS transmission may be done by constructing a general "network-view" PRS report that can be based on what the LMF has received via LPP from the UE PRS measurements reporting. The LMF can in fact store the information on the reported UE measurements in a general PRS activity report that indicates which PRS report belongs to which beam/resource/resource-set that is transmitted by a transmission-reception point (TRP). The LMF can then send this report to the NG-RAN, which can help the latter identifying which beams should be selected by gNB to transmit PRS. The gNBs can then adapt the PRS beam transmission by turning some of the PRS beams off and thus reducing the overhead.

In some embodiments, positioning reference signals (PRS) are periodically transmitted by the gNB on a positioning frequency layer (PFL) in PRS resources in the DL. The information about the PRS resources (e.g., PRS assistance data) is signaled to the UE by the positioning server (e.g., LMF) via higher layers, e.g., via LTE positioning protocol (LPP). The UE uses the received PRS assistance data for performing one or more positioning measurements, e.g., reference signal time difference (RSTD), PRS reference signal received power (PRS-RSRP), UE Rx-Tx time difference, etc. Each positioning frequency layer comprises PRS resource sets, where each PRS resource set comprises one or more PRS resources. All the DL PRS resources within one PRS resource set are configured with the same periodicity. The PRS resource periodicity ($T_{per}^{PRS}$) comprises:

$$T_{per}^{PRS} \in 2^{\mu}\{4, 8, 16, 32, 64, 5, 10, 20,$$
$$40, 80, 160, 320, 640, 1280, 2560, 5120, 10240, 20480\}$$

slots, where $\mu=0$, 1, 2, 3 for PRS subcarrier spacing (SCS) of 15, 30, 60 and 120 kHz respectively.

$$T_{per}^{PRS} = 2^{\mu} \cdot 20480$$

is not supported for $\mu=0$.

Each PRS resource can also be repeated within one PRS resource set and takes values $$T_{rep}^{PRS} \in \{1, 2, 4, 6, 8, 16, 32\}.$$

PRS are transmitted in a consecutive number of symbols ($L_{PRS}$) within a slot: $L_{PRS} \in \{2, 4, 6, 12\}$. The following DL PRS resource element (RE) patterns, with comb size $K_{PRS}$ equal to number of symbols $L_{PRS}$, are supported:

Comb-2: Symbols $\{0, 1\}$ have relative RE offsets $\{0, 1\}$
Comb-4: Symbols $\{0, 1, 2, 3\}$ have relative RE offsets $\{0, 2, 1, 3\}$
Comb-6: Symbols $\{0, 1, 2, 3, 4, 5\}$ have relative RE offsets $\{0, 3, 1, 4, 2, 5\}$
Comb-12: Symbols $\{0, 1, 2, 3, 4, 5, 6, 7, 8, 9, 10, 11\}$ have relative RE offsets $\{0, 6, 3, 9, 1, 7, 4, 10, 2, 8, 5, 11\}$ In some embodiments, the maximum PRS bandwidth (BW) is 272 physical resource blocks (PRBs), the minimum PRS BW is 24 PRBs, and the configured PRS BW is always a multiple of 4.

In general, a PRS resource set may comprise parameters such as subcarrier spacing (SCS), PRS BW, PRS resource set periodicity and slot offset with respect to reference time (e.g., SFN #0, slot #0), PRS resource repetition factor (e.g., number of times PRS resource repeated in a PRS resource set), PRS symbols in PRS resource, PRS resource time gap (e.g., number of slots between successive repetitions), PRS muting pattern, etc. Here, SFN stands for system frame number.

DL-PRS Configuration

Some embodiments herein configure DL-PRS as follows, e.g., consistent with TS 38.214 v16.6.0. In some embodiments, the UE can be configured with one or more DL PRS resource set configuration(s) as indicated by the LPP (TS 37.355 v16.3.0) parameters nr-DL-PRS-ResourceSet-r16 and nr-DL-PRS-Resource-r16. The UE can be configured with one or more DL PRS positioning frequency layer configuration(s) as indicated by the LPP parameter nr-DL-PRS-PositioningFrequencyLayer-r16. A DL PRS positioning frequency layer is defined as a collection of DL PRS resource sets which have common parameters configured by nr-DL-PRS-PositioningFrequencyLayer-r16, e.g., where the common parameters include subcarrier spacing, cyclic prefix, absolute frequency, and/or lowest subcarrier (Point A).

In some embodiments, a DL PRS resource set consists of one or more DL PRS resources and is defined by Clause 6.4.2.1 of TS 37.355 v16.3.0. In some embodiments, for example, a DL RS resource set is defined by (i) the identity of the DL PRS resource set configuration; (ii) a DL PRS resource periodicity; (iii) how many times each DL-PRS resource is repeated for a single instance of the DL-PRS resource set; (v) an offset in number of slots between two repeated instances of a DL PRS resource within a single instance of the DL PRS resource set; (vi) the time locations where the DL PRS resource is expected to not be transmitted for a DL PRS resource set; (vii) the time offset of the SFN0 slot 0 for the transmitting cell with respect to SFN0 slot 0 of reference cell; (viii) a comb size of a DL PRS resource; and (ix) a number of resource blocks configured for DL PRS transmission; (xi) a starting PRB index of the DL PRS resource with respect to reference Point A.

In some embodiments, a DL PRS resource is defined by (i) a DL PRS resource configuration identity; (ii) an initial $c_{init}$ value used in pseudo random for generation of DL PRS sequence for a given DL PRS resource; (iii) a starting resource element (RE) offset of the first symbol within a DL PRS resource in frequency; (iv) a starting slot of the DL PRS resource with respect to corresponding DL PRS resource set slot offset; (v) a starting symbol of a slot configured with the DL PRS resource; (vi) a number of symbols of the DL PRS resource within a slot; (vii) any quasi-colocation information of the DL PRS resource with other reference signals.

Positioning Methods

Some embodiments are applicable for one or more of the following positioning techniques.

Enhanced Cell ID. Essentially cell ID information to associate the device to the serving area of a serving cell, and then additional information to determine a finer granularity position.

Assisted Global navigation satellite system (GNSS). GNSS information retrieved by the device, supported by assistance information provided to the device from an Evolved Serving Mobile Location Center (E-SMLC).

OTDOA (Observed Time Difference of Arrival). The device estimates the time difference of reference signals from different base stations and sends to the E-SMLC for multilateration.

UTDOA (Uplink Time Difference of Arrival). The device is requested to transmit a specific waveform that is detected by multiple location measurement units (e.g., an eNB) at known positions. These measurements are forwarded to E-SMLC for multilateration.

Sensor methods such as Biometric pressure sensor which provides vertical position of the device and Inertial Motion Unit (IMU) which provides displacement.

DL-TDOA: The DL TDOA positioning method makes use of the DL RSTD (and optionally DL PRS Reference Signal Received Power, RSRP) of downlink signals received from multiple transmission points (TPs), at the UE. The UE measures the DL Reference Signal Time Difference (RSTD) (and optionally DL PRS RSRP) of the received signals using assistance data received from the positioning server, and the resulting measurements are used along with other configuration information to locate the UE in relation to the neighbouring TPs.

Multi-RTT (Multi-Round Trip Time): The Multi-RTT positioning method makes use of the UE Rx-Tx measurements and DL PRS RSRP of downlink signals received from multiple TRPs, measured by the UE and the measured gNB Rx-Tx measurements and UL SRS-RSRP at multiple TRPs of uplink signals transmitted from UE.

UL-TDOA: The UL TDOA positioning method makes use of the UL TDOA (and optionally UL SRS-RSRP) at multiple RPs of uplink signals transmitted from UE. The reception points (RPs) measure the UL TDOA (and optionally UL SRS-RSRP) of the received signals using assistance data received from the positioning server, and the resulting measurements are used along with other configuration information to estimate the location of the UE.

DL-AoD: The DL angle of departure (AoD) positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighbouring TPs.

UL-AoA: The UL angle of arrival (AoA) positioning method makes use of the measured azimuth and zenith of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

NR-ECID: NR Enhanced Cell ID (NR E-CID) positioning refers to techniques which use additional UE measurements and/or NR radio resource and other measurements to improve the UE location estimate.

Gap Based and Gapless PRS Measurements

Some embodiments herein are applicable in a context for gap-based PRS measurements and/or gapless PRS measurements.

More particularly in this regard, in 3GPP release 16, PRS-based measurements (including PRS-RSRP, RSTD for OTDOA, and UE Rx-Tx time difference for RTT) are all made in the presence of measurement gaps. During a measurement gap, the UE can expect that the network will not transmit any data and thus the UE can tune itself specifically to measure the PRS. For example, to measure PRS (i.e., DL PRS), the UE will potentially utilize a different bandwidth than the active bandwidth part it is configured with to receive data.

In NR release 17, by contrast, a UE may measure the DL PRS without the need for measurement gaps. If the bandwidth part of the UE is wide enough to cover the DL PRS bandwidth, the UE can measure the PRS without requesting measurement gaps. Based on a priority indication from gNB, when a downlink channel or another downlink reference signal with higher priority collides with DL PRS measurement/processing, then the UE will drop the DL PRS measurement/processing.

Some embodiments herein address a challenge that exists in this context. In particular, gapless measurements introduce a PRS processing window where the UE only processes PRS measurements and cannot process any other DL data or channel. For gapless PRS measurements, this behavior can heretofore introduce unwanted behavior of the UE dropping ongoing priority data reception and processing PRS measurements. This can be particularly problematic if the UE is in the middle of a high priority data reception.

To avoid this, a priority indication by gNB has to be introduced. However, when the PRS measurements are dropped in favor of DL data, the LMF heretofore does not know about the PRS measurements dropping until measurement response time is completed. The LMF can request a fresh measurement only after the response time; this causes network latency in getting the PRS measurements.

Even for PRS measurements outside a measurement gap, the gNB may prioritize data over PRS transmission. This can lead to larger latency in getting the location measurement from the UE.

Certain aspects of the disclosure and their embodiments may provide solutions to these or other challenges.

Embodiments herein allow hand-shaking between LMF and gNB in order to guarantee that PRS resources are not dropped during a certain time. This certain time could coincide with a measurement gap when a UE is configured to perform PRS measurements within a measurement gap. Or, when the wireless communication device is capable of performing gapless PRS measurements and is configured with such gapless PRS measurements, this time could coincide with a so-called PRS processing window during which the wireless communication device is expected to prioritize PRS over data. The measurement gap and PRS processing window can more generally be referred to as a "measurement occasion" or "PRS measurement occasion". This handshaking between the location server and the gNB can be done via a new dynamic indication from the LMF to the gNB, and from the gNB to the LMF. In some embodiments, the new dynamic indication may indicate which PRS resources have been maintained and/or dropped. Or, in other embodiments, the dynamic indication may indicate which PRS will be maintained only for a certain time duration (i.e., measurement occasion) before being dropped completely based on the scheduling information at the gNB.

Furthermore, according to some embodiments, a method is specified such that the UE's start time for positioning measurements can be signalled to the gNB/TRP.

Below represents a brief, high-level, non-limiting description of some embodiments for each system node.

Consider first some embodiments from the perspective of a UE (a device). The UE may send, e.g., an Enhanced Cell ID (E-CID) information message via LPP to LMF to convey the information about the best TRPs seen by the UE. The UE, upon receiving an indication from an gNB about the start time of PRS measurements, starts performing the PRS measurements following bitmap information indicated by the TRPs. The UE sends the PRS measurement report to the LMF within a certain response time.

Consider next some embodiments from the perspective of an LMF (generally called a location server). The LMF may request the gNB to preserve specific PRS resources, resource sets, or even all resources mapped to a TRP ID based on the information received from a UE (or without the information received from the UE). The LMF may also request for periodic information of scheduling availability of PRS resources at the gNB.

Consider now some embodiments from the perspective of the gNB (or TRP hosted in the gNB distributed unit). The gNB responds to the LM's request for the gNB to preserve specific PRS resources, resource sets, or all resources mapped to a TRP IDF. In case of acknowledgment, the gNB informs the LMF that all the specific PRS resources indicated in the requested message have been reserved for the DL PRS transmission. By contrast, in case of partial failure, the gNB informs the LMF that the specific request will be limited in time, indicating the list of TRP IDs for which the reserved resources for this PRS transmission can be guaranteed for a particular period of time. On the other hand, in the case of failure, the gNB informs the LMF that none of the slots for which PRS transmission can be guaranteed is available and the procedure stops. Note that the gNB, based on the scheduling information available at the gNB, can indicate to the LMF about the PRS resources which gNB can transmit or allocate for a certain period of time. This may be different from the LMF requested resources.

Certain embodiments may provide one or more of the following technical advantage(s). With the newly introduced dynamic interaction between the gNB and the LMF, the LMF can avoid scheduling gapless and gap-based PRS measurements during DL (priority) data occasions. This enables latency improvement for location measurements. Alternatively or additionally, the UE location accuracy based on PRS-based positioning measurements is enhanced. Some embodiments alternatively or additionally provide flexibility in the gNB to adapt scheduling of data during PRS resources.

Dynamic Guaranteed PRS Transmission/Measurement Window

In order to avoid dropping of DL-PRS measurement by UEs when high priority data occurrence collides with DL-PRS measurements, the LMF may negotiate with each of one or more TRPs (gNBs) involved, to provide a (minimum) window where PRS transmission and UE DL-PRS measurement would be guaranteed. In order to allow gNBs to save energy by turning off DL-PRS transmission and also avoid gNB to regularly prioritize data over positioning reference signal, the LMF in some embodiments provides necessary information to the gNB such as current PRS utilization (number of UEs performing PRS measurements and quality of such measurements). Based upon such information, the gNB reserves certain resources (time/frequency) for DL-PRS transmission which are guaranteed for a certain duration. The LMF may gather such information from each of the TRPs and come up with a common DL-PRS measurement window which is then communicated to all of the involved TRPs (gNBs). The gNBs are aware of the guaranteed measurement window duration of neighbor cells and hence the serving gNB commits that it will not schedule data during that committed PRS measurement duration. The flow-chart in FIG. 3 illustrates additional details.

Figure 3:
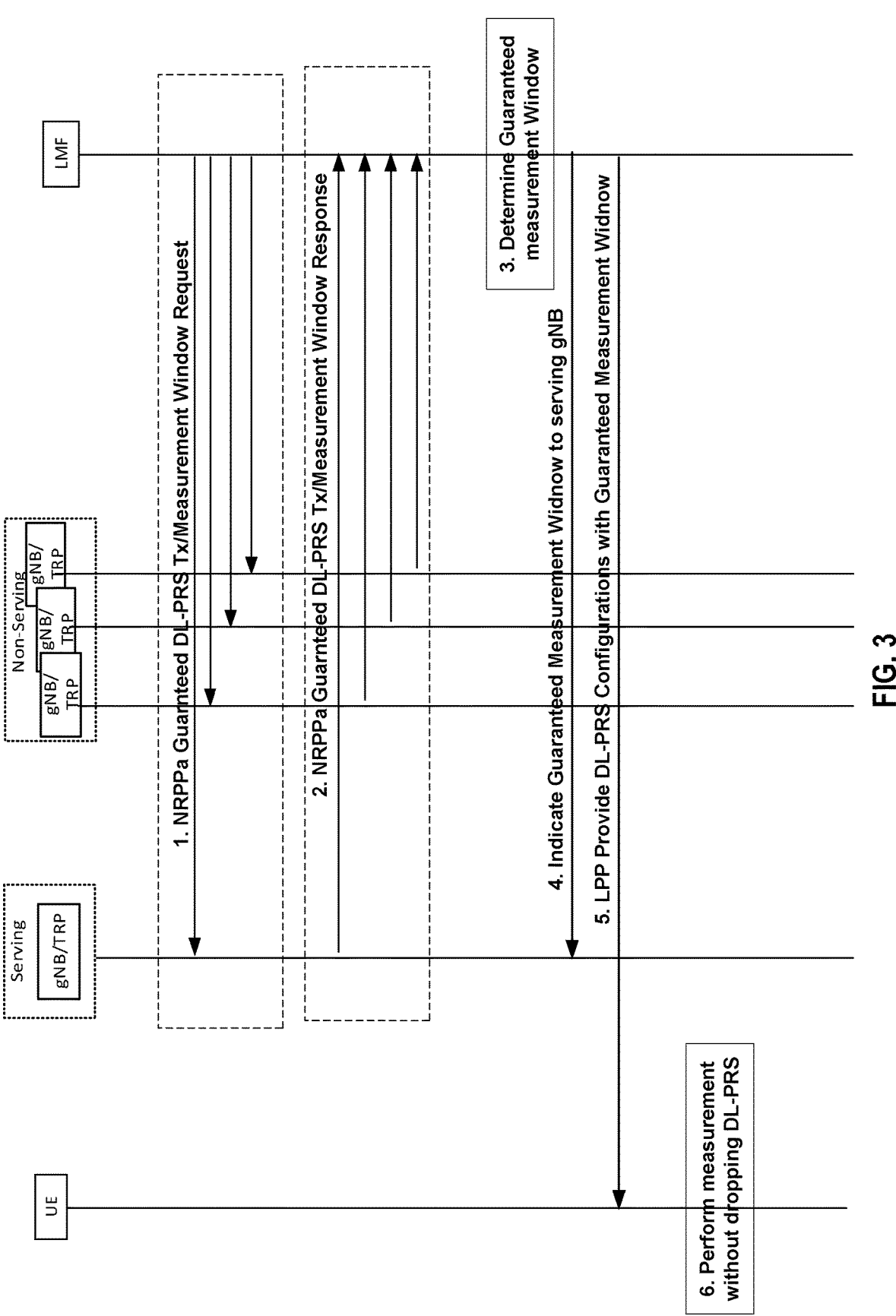
FIG. 3 is a call flow diagram for positioning reference signal configuration according to some embodiments.

FIG. 3 in particular shows the system signaling flow for a high-level non-limiting example of some embodiments.

Step 0 (not shown): LMF gets TRP capabilities from serving and neighbor gNBs

Step 1: LMF requests serving and non-serving gNBs to provide a guaranteed DL-PRS measurement window such that the UE shall not drop DL_PRS measurements Step 2: Serving and non-serving gNBs provide such measurement window (DL-PRS Tx occasions)

Step 3: LMF strives to prepare for a common guaranteed measurement window (i.e., the X ms mentioned above)

Step 4: LMF indicates such measurement duration to serving gNB. Serving gNB ensures that it does not schedule data during such occasions.

Step 5: LMF provides the configuration of guaranteed measurement window to the UE.

Step 6: UE performs the DL-PRS measurement without having to drop the DL-PRS measurements.

In some embodiments, the PRS transmission/measurement window thus varies based upon number of UEs performing positioning and quality of transmitted PRS and is maintained by the LMF and negotiated with different TRPs on a regular time interval.

Configuration and Signaling Procedures

Consider some embodiments for the positioning server (e.g., LMF). In one embodiment, the positioning server (e.g., LMF) triggers a scheduling information request to the base station (BS), e.g., TRP, gNB. This scheduling information request is an example of the request 24 in FIG. 1. The triggering of the scheduling request to the BS may be based on the UE reports and/or information received from various TRPs and/or when a positioning request is received at the positioning server. The purpose of the scheduling information request is to request a BS (e.g., gNB) to inform the LMF about the availability of PRS resources in the BS.

In another embodiment, the signalling of this scheduling request can encompass specific DL-PRS resources or resource sets, with their level of priority (e.g., compared to other signals such as Physical Downlink Shared Channel (PDSCH), Physical Downlink Control Channel (PDCCH), etc.) and the time under which the DL-PRS should be scheduled by the gNB. For example, the scheduling information request sent by the LMF to the gNB may indicate that the gNB should transmit DL-PRS resources or resource sets until a certain time period (T1) starting from a reference time (Tref1). This means the LMF requests the gNB to prioritize the transmission of the PRS resources over all other signals (e.g., DL reference signals, DL channels, etc.) during $\Delta T1=(T1-Tref1)$ starting from Tref. Examples of Tref1 are one or more of: time of the reception of the request message at the gNB, absolute time (e.g., UTC time), system frame number (SFN) number #X1 of a reference cell and/or slot number #X2 and/or subframe number #X3, etc. The time period (T1) can be expressed in time units (e.g., ms, seconds, etc.) and/or in time resources (e.g., symbols, slots, subframes, frames, SFN cycle, hyper SFN cycle, etc.). The parameters, T1, Tref1, X1, X2, and X3 can be pre-defined or configured by the network (e.g., by LMF). The LMF may also include information about the DL-PRS resources which should be transmitted by the gNB until T1 starting from Tref1.

In another embodiment, the LMF may send a periodic request for scheduling information from the gNB.

In another embodiment, this scheduling request from the LMF can be for each TRP hosted by the gNB, characterized by its TRP ID.

In an alternative embodiment, the signalling can be done by a new message; or enhancing any NRPPa signalling, such as the PRS Configuration Exchange procedure defined in rel-17 version of TS 38.455. An example of the signaling is provided below with the new indication in bold underline: 9.1.1.a1 PRS Configuration Request (as an Example of Request 24 in FIG. 1)

This message is sent by LMF to request NG-RAN node configuring the PRS transmission. Direction: LMF→NG-RAN node.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| PRS TRP List | | [FFS] | | | YES | ignore |
| >PRS TRP Item | | 1 . . . <maxnoTRPs> | | | EACH | ignore |
| >>TRP ID | M | | 9.2.24 | | — | |
| >>Requested DL PRS Transmission Characteristics | [FFS] | | 9.2.x1 | | YES | ignore |

| Range bound | Explanation |
|---|---|
| maxnoTRPs | Maximum no. of TRPs in a NG-RAN node. Value is 65535 |

9.2.x1 Requested DL PRS Transmission Characteristics

This information element (I E) contains the requested PRS configuration for transmission by the LM F.

| IE/Group Name | Presence | Range | IE Type and Reference | Semantics Description |
|---|---|---|---|---|
| PRS resource or resource set | M | | Can be as defined in section 9.2.44 of TS 38.455 | |
| DL PRS Prioritization level | O | | ENUMERATED (LP, MP, HP, . . . ) | LP: low priority MP: medium priority HP: high priority Other type of prioritization granularity not precluded |
| Scheduling window ΔT1 | O | | INTEGER (0, . . . N) | The time under which the measurements should be reported back to LMF. 'N' denotes a maximum time. |

Based on the scheduling information received from the gNB, the LMF can acknowledge the gNB feedback message and can send assistance data to the UE for PRS measurements In yet another embodiment, the scheduling signalling can be left to vendor implementation.

Base Station (e.g., qNB, TRP) Related Embodiments:

Consider next some embodiments related to the base station. In one embodiment, the BS (e.g., gNB) can decide to schedule the PRS resources as indicated or requested by the positioning server (e.g., LMF), or partially schedule some of them, or none, until a certain time period (T2) starting from a certain reference time (Tref2). The time period (T2) can be expressed in time units (e.g., ms, seconds, etc.) and/or in time resources (e.g., symbols, slots, subframes, frames, System Frame Number (SFN) cycle, hyper SFN cycle, etc.). Examples of Tref2 are one or more of: time of the reception of the request message at the gNB, absolute time (e.g., UTC time), system frame number (SFN) number #Y1 of a reference cell and/or slot number #Y2 and/or subframe number #Y3 etc. In one example, T1 and T2 are different. In another example, T1 and T2 are the same. In one example, Tref1 and Tref2 are different. In another example, Tref1 and Tref2 are the same. Examples of response message sent by the gNB to LMF are as follows.

In one embodiment, the gNB sends a bitmap (e.g., utilization) where each bit indicates whether PRS in a certain PRS resource is transmitted or not. For example, a bit value of 1 may indicate that the PRS in a PRS resource is transmitted whereas a bit value of 0 may indicate that the PRS in a PRS resource is not transmitted, e.g., due to scheduling of other signals such as PDSCH during the PRS resource. In another example, a bit map may span over a PRS resource set. In this case, each bit in the bitmap indicates whether PRS in a certain PRS resource within a PRS resource set is transmitted or not. In another example, a bit map may span over multiple PRS resource sets. In this case, each bit in the bitmap indicates whether PRS in the PRS resources within a certain PRS resource set are transmitted or not. The PRS resource or PRS resource occurrence or PRS occasion can be expressed in terms of one or more time resources. Examples of time resources are symbols, slots, subframes, etc. Regardless, the length of the bitmap can be 1 or more bits, e.g., {1, 2, 4, 6, 8, 16, 32} bits. The bitmap starts at a certain reference time (e.g., one or more of: SFN #Z1, slot number #Z2, subframe number #Z3 etc.), and spans a finite duration proportional to the length of the bitmap, after which all subsequent PRSs are transmitted without guarantee of not being preempted by data. Alternatively, the bitmap can be recurring, i.e., the bitmap is a repeating pattern.

Consider an example of a PRS resource set level bitmap comprising of 4 bits for 4 consecutive PRS resource sets, e.g., {1 0 0 1}. In this example, the PRS are transmitted in all of the PRS resources in the $1^{st}$ and the $4^{th}$ PRS transmission occasions (e.g., on all symbols, slots on which the PRS resource set is configured for one occasion). But, in the $2^{nd}$ and the $3^{rd}$ PRS transmission occasions (e.g., on all symbols, slots on which the PRS resource set is configured for one occasion), no PRS is transmitted, e.g., due to data scheduling.

In another example, a 1 bit bitmap may indicate whether all PRS resources are available or not.

In another example, the bitmap is declared to be recurrent. In the 4-bit example, this means the PRS are transmitted in the $1^{st}$ and $4^{th}$, $5^{th}$ and $9^{th}$ transmission occasions, and so on.

In case of full scheduling capability for the requested PRS prioritized transmission, the gNB replies to the LMF that the scheduling can be or has been achieved as requested by the positioning server. This means the gNB will transmit the PRS in the PRS resources or resource set during at least ΔT2=(T2−Tref2) starting from Tref2. To achieve this objective, in one example, the gNB may have to avoid transmission of any signal other than PRS during the PRS resources, e.g., during the PRS subframe, PRS slot, PRS symbol etc. An example can be in the PRS CONFIGURATION RESPONSE message.

In case of partial scheduling of PRS, in one example, the gNB schedules a list of PRS resources for each TRP under a specific time period. The gNB may also indicate the time period over which the PRS resources can be transmitted. In another example, the gNB schedules PRS only in a subset of PRS resources during ΔT2=(T2−Tref2) starting from Tref2. To achieve this objective in one example the gNB may have to avoid transmission of some of the signals other than PRS during the PRS resources, e.g., during the PRS subframe, PRS slot, PRS symbol, etc. The gNB replies to the LMF indicating such list. An example can be the PRS CONFIGU-RATION PARTIAL RESPONSE (new message) or PRS CONFIGURATION RESPONSE message. An example using the latter message and encompassing the above embodiments is provided below.

9.1.1.a2 PRS Configuration Response (as an Example of Signaling 18 in FIG. 1)

This message is sent by NG-RAN node to acknowledge updating the PRS transmission.

Direction: NG-RAN node→LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| PRS Transmission TRP List | | [FFS] | | | YES | ignore |
| >PRS Transmission TRP Item | | 1 . . . <maxnoTRPs> | | | EACH | ignore |
| >>TRP ID | M | | 9.2.24 | | — | |
| >>On-demand PRS information | [FFS] | | 9.2.x2 | | YES | ignore |

| Range bound | Explanation |
|---|---|
| maxnoTRPs | Maximum no. of TRPs in a NG-RAN node. Value is 65535 |

9.2.x3 On-Demand PRS TRP Information

This IE contains on-demand PRS information for the TRP.

| IE/Group Name | Presence | Range | IE Type and Reference | Semantics Description |
|---|---|---|---|---|
| Partial On-demand PRS Configuration | O | | Enumerated (true, . . . ) | This IE is set to 'true' only when the gNB sends partial PRS measurements |
| PRS configuration index | O | | INTEGER (1, . . . 64) | |
| Validity time/response time ΔT2 | O | | INTEGER (0 . . . m) | Measurement response time, 'm' denotes a maximum time |
| gNB prioritization | O | | ENUMERATED (LP, MP, HP, . . . ) | LP: low priority MP: medium priority HP: high priority Other type of prioritization granularity is not precluded |

-continued

| IE/Group Name | Presence | Range | IE Type and Reference | Semantics Description |
|---|---|---|---|---|
| bitmap | O | | | |
| Bitmap granularity | O | | | |
| Bitmap recurrence | | | ENUMERATED ('One-shot', 'recurrent', . . . ) | If "one shot" the validity time is the length of the bitmap. If recurrent, the bitmap cycles over the duration of the validity time. |

In alternative embodiment, in case the gNB could not fulfill the LMF request for any of the requested PRS scheduling prioritization, it replies with a failure message, with a proper cause value. An example can be the PRS CONFIGURATION FAILURE message 9.1.1.a3 PRS Configuration Failure This message is sent by NG-RAN node to indicate that it cannot configure any PRS transmission.

Direction: NG-RAN node→LMF.

| IE/Group Name | Presence | Range | IE type and reference | Semantics description | Criticality | Assigned Criticality |
|---|---|---|---|---|---|---|
| Message Type | M | | 9.2.3 | | YES | reject |
| NRPPa Transaction ID | M | | 9.2.4 | | — | |
| Cause | M | | 9.2.1 | | YES | ignore |
| Criticality Diagnostics | O | | 9.2.2 | | YES | ignore |
| Prioritization failure | O | | Enumerated (true, . . . ) | This IE is set to 'true', when the gNB failed all prioritization requests from the LMF | | |

In another embodiment, the gNB may send periodic scheduling information of DL-PRS resource configuration to the LMF.

In some embodiments, the information described in embodiments described above is signalled over the F1 interface in a split-gNB scenario between gNB-CU and gNB-DUs. Here, CU stands for central unit and DU stands for distributed unit.

In yet another embodiment, the scheduling signalling can be left to vendor implementation.

UE Related Embodiments:

Consider now some embodiments related to the UE.

In one embodiment, the UE receives the PRS assistance data from the positioning server to perform one or more positioning measurements. The PRS assistance data received from the LMF may comprise information such as PRS ID, PRS BW, PRS symbols, PRS repetition factor, PRS periodicity and slot offset, TRP ID, etc. For example, the UE may receive assistance data at certain time instance, Ta.

The UE may further receive information about the starting time instance (Ts) for performing the PRS measurements. Ts may be expressed in certain time units or in time resources, e.g., SFN number #Z1, slot number #Z2, subframe number #Z3, etc. The purpose of Ts can be defined by a rule. In one example of the rule, the UE is required or is expected to perform the positioning measurements starting from the time instance, Ts. In another example of the rule, the UE should not perform the positioning measurements before the time instance, Ts. In one example, Ts occurs after Ta i.e., Ts>Ta. In another example Ts=Ta. The UE may obtain information about Ts based on a pre-defined rule and/or by receiving it from a network node, for example.

In one example, the parameter Ts is received by the UE from the positioning server, e.g., LMF. In one example, the UE may receive Ts in the PRS assistance data. In another example, the UE may receive Ts after the assistance data.

In another example, the start time (Ts) of PRS measurements shall be received from the gNB. The start time of PRS measurements can be received for example through downlink control information (DCI) signaling, Radio Resource Control (RRC), or Medium Access Control (MAC) Control Element (MAC-CE).

In some embodiments, the UE may further be configured with a bit map indicating the availability of the PRS in the PRS resources in each TRP configured for PRS measurements. For example, the UE can be configured with a PRS resource set level bitmap comprising of 4 bits for 4 consecutive PRS resource sets, e.g., {1 0 0 1}. In this example, the PRS are transmitted in all the PRS resources in the 1$^{st}$ and the 4$^{th}$ PRS resource sets. But, in the 2$^{nd}$ and the 3$^{rd}$ PRS resource sets, no PRS is transmitted, e.g., due to data scheduling.

The UE may further be configured to treat the bit map above as either one shot or recurrent. If the bitmap is configured as "one shot", the bitmap length corresponds to the validity time during which the network may guarantee PRS transmission. If the bitmap is configured as "recurrent", the bitmap is repeated cyclically over the duration of the validity period. For example, if the bitmap is configured as one shot, the following bit map of {1 0 0 1} is valid for a duration of 4 consecutive PRS resource set duration. If it is recurrent, by contrast, the same pattern is valid and repeated for every 4 PRS resource set period.

In some embodiments, the UE uses the received information about the start time (Ts) and the PRS assistance data for performing the PRS measurements. For example, the UE performs PRS measurements starting from Ts or after Ts.

The UE may further use the received information about the bit map indicating the availability of the PRS in the PRS resources for performing the PRS measurements. For example, the UE measures PRS only in PRS resources which are transmitted by the TRP as indicated by the bit map information. The UE further sends the PRS measurement report to LMF within a certain response time.

In view of the modifications and variations herein, FIG. 4 depicts a method performed by a radio network node 14 configured for use in a wireless communication network 10 in accordance with particular embodiments. The method includes transmitting, to a location server 20, signaling 18 indicating one or more time occasions 22 reserved by the radio network node 14 for positioning reference signal, PRS, transmission 16 (Block 420).

In some embodiments, the signaling 18 is transmitted in response to a request from the location server 20. In these embodiments, the method may further comprise receiving, from the location server 20, a request for the radio network node 14 to reserve one or more time occasions 22 for PRS transmission 16 (Block 400), where the signaling 18 is transmitted responsive to or based on the request. In some embodiments, at least one of the one or more time occasions indicated as reserved by the signaling is the same as at least one of the one or more time occasions requested by the location server to be reserved. Alternatively or additionally, in some embodiments, the signaling indicates one or more time occasions reserved by the radio network node for PRS transmission by indicating acceptance of the request.

In some embodiments, the method may also comprise reserving the one or more time occasions 22 for PRS transmission 16 (Block 410), where the signaling 18 indicates the one or more time occasions 22 reserved.

In some embodiments, the method may comprise performing PRS transmission 16 in the one or more time occasions 22 indicated (Block 430). Alternatively or additionally, the method may comprise refraining from scheduling any transmission other than PRS transmission 16 in the one or more time occasions 22 indicated as reserved for PRS transmission, or dropping any transmission other than PRS transmission 16 scheduled for transmission in the one or more time occasions 22 indicated as reserved for PRS transmission 16 (Block 440).

In some embodiments, the method further comprises, after transmitting the signaling, receiving, from the location server, an indication of one or more common time occasions that are commonly reserved by multiple radio network nodes for PRS transmission. In one such embodiment, the one or more common time occasions are included in a common guaranteed PRS measurement window. Regardless, in some embodiments, the method may further comprise refraining from scheduling any transmission other than PRS transmission in the one or more common time occasions, or dropping any transmission other than PRS transmission scheduled for transmission in the one or more common time occasions. Alternatively or additionally, the method may further comprise performing PRS transmission in the one or more common time occasions.

In some embodiments, the signaling indicates one or more time occasions unconditionally reserved by the radio network node for PRS transmission, such that PRS transmission in the one or more time occasions is guaranteed. Alternatively, in other embodiments, the signaling indicates one or more time occasions reserved by the radio network node for PRS transmission subject to PRS transmission having at least as high of priority as any other transmissions contending for transmission in the one or more time occasions.

In some embodiments, the signaling indicates a priority of PRS transmission.

In some embodiments, the signaling indicates PRS transmission has a priority that is at least as high as a downlink data channel transmission.

In some embodiments, the one or more time occasions comprise one or more PRS resources. In other embodiments, the one or more time occasions comprise one or more sets of PRS resources.

In some embodiments, the signaling includes a bitmap comprising bits that are respectively associated with time occasions, wherein values of the bits respectively indicate whether the associated time occasions are reserved for PRS transmission. In one embodiment, for example, the signaling indicates a granularity of the bitmap so as to indicate a duration of each of the time occasions. Alternatively or additionally, the signaling indicates whether or not reservation of the one or more time occasions for PRS transmission will recur according to the bitmap.

In some embodiments, the signaling indicates a time at which the one or more time occasions start.

In some embodiments, the one or more time occasions are one or more consecutive time occasions.

In some embodiments, the one or more time occasions are included in a time window within which PRS transmission by the radio network node is guaranteed. In other embodiments, the one or more time occasions are included in a minimum time window within which PRS transmission by the radio network node is guaranteed.

In some embodiments, the signaling indicates, for each of one or more transmission reception points, one or more time occasions reserved by the radio network node for positioning reference signal, PRS, transmission from that transmission reception point.

In some embodiments, the method further comprises, based on the signaling, avoiding scheduling PRS measurements during a downlink priority data occasion. In other embodiments, the method further comprises, based on the signaling, avoiding scheduling gapless PRS measurements during a downlink priority data occasion.

Note that, although the method in FIG. 4 is illustrated with reference to a location server 20, the location server 20 in other embodiments be some other network node. For example, in other embodiments involving a split radio network node (e.g., a split gNB), the location server 20 in FIG. 4 may be a central unit (CU) of the split radio network node (e.g., a gNB-CU). In one such embodiment, then, the radio network node 14 performing the method may be a distributed unit (DU) of the split radio network node (e.g., a gNB-DU).

FIG. 5 depicts a method performed by a location server 20 configured for use in a wireless communication network 10 in accordance with other particular embodiments. The method includes receiving, from a radio network node 14, signaling 18 indicating one or more time occasions 22 reserved by the radio network node 14 for positioning reference signal, PRS, transmission 16 (Block 510).

In some embodiments, the signaling 18 is received in response to a request. In these embodiments, then, the method may further comprise transmitting, from the location server 20 to the radio network node 14, a request 24 for the radio network node 14 to reserve one or more time occasions 22 for PRS transmission 16 (Block 500), where the signaling 18 is received responsive to or based on the request 24. In some embodiments, at least one of the one or more time occasions indicated as reserved by the signaling is the same as at least one of the one or more time occasions requested by the location server to be reserved. In some embodiments, the signaling indicates one or more time occasions reserved by the radio network node for PRS transmission by indicating acceptance of the request.

In some embodiments, the method also comprises determining one or more common time occasions based on signaling received from the multiple radio network nodes indicating one or more time occasions respectively reserved by the multiple radio network nodes for PRS transmission (Block 520). In some embodiments, the one or more common time occasions are included in a common guaranteed PRS measurement window. Regardless, in some embodiments, the method may also comprise, after receiving the signaling, transmitting, from the location server to the radio network node, an indication of one or more common time occasions that are commonly reserved by multiple radio network nodes for PRS transmission (Block 530).

In some embodiments, the signaling indicates one or more time occasions unconditionally reserved by the radio network node for PRS transmission, such that PRS transmission in the one or more time occasions is guaranteed. Alternatively, in other embodiments, the signaling indicates one or more time occasions reserved by the radio network node for PRS transmission subject to PRS transmission having at least as high of priority as any other transmissions contending for transmission in the one or more time occasions.

In some embodiments, the signaling indicates a priority of PRS transmission.

In some embodiments, the signaling indicates PRS transmission has a priority that is at least as high as a downlink data channel transmission.

In some embodiments, the one or more time occasions comprise one or more PRS resources. In other embodiments, the one or more time occasions comprise one or more sets of PRS resources.

In some embodiments, the signaling includes a bitmap comprising bits that are respectively associated with time occasions, wherein values of the bits respectively indicate whether the associated time occasions are reserved for PRS transmission. In one embodiment, for example, the signaling indicates a granularity of the bitmap so as to indicate a duration of each of the time occasions. Alternatively or additionally, the signaling indicates whether or not reservation of the one or more time occasions for PRS transmission will recur according to the bitmap.

In some embodiments, the signaling indicates a time at which the one or more time occasions start.

In some embodiments, the one or more time occasions are one or more consecutive time occasions.

In some embodiments, the one or more time occasions are included in a time window within which PRS transmission by the radio network node is guaranteed. In other embodiments, the one or more time occasions are included in a minimum time window within which PRS transmission by the radio network node is guaranteed.

In some embodiments, the signaling indicates, for each of one or more transmission reception points, one or more time occasions reserved by the radio network node for positioning reference signal, PRS, transmission from that transmission reception point.

In some embodiments, the method further comprises, based on the signaling, avoiding scheduling PRS measurements during a downlink priority data occasion. In other embodiments, the method further comprises, based on the signaling, avoiding scheduling gapless PRS measurements during a downlink priority data occasion.

Note that, although the method in FIG. 5 is illustrated as being performed by a location server 20, the location server 20 in other embodiments be some other network node. For example, in other embodiments involving a split radio network node (e.g., a split gNB), the location server 20 performing the method in FIG. 5 may be a central unit (CU) of the split radio network node (e.g., a gNB-CU). In one such embodiment, then, the radio network node 14 involved in the method of FIG. 5 may be a distributed unit (DU) of the split radio network node (e.g., a gNB-DU).

FIG. 6A depicts a method performed by a wireless communication device configured for use in a wireless communication network 10 in accordance with other particular embodiments. The method includes receiving, from a location server 20, signaling indicating one or more time occasions 22, wherein the one or more time occasions 22 are: (i) one or more time occasions in which the wireless communication device is to perform positioning reference signal, PRS, measurement; and/or (ii) reserved by the radio network node 14 for PRS transmission 16 (Block 600). In some embodiments, the method further comprises performing PRS measurement on PRS received in the one or more time occasions indicated (Block 610).

In some embodiments, the signaling indicates one or more time occasions unconditionally reserved by the radio network node for PRS transmission, such that PRS transmission in the one or more time occasions is guaranteed.

In some embodiments, the signaling indicates one or more time occasions reserved by the radio network node for PRS transmission subject to PRS transmission having at least as high of priority as any other transmissions contending for transmission in the one or more time occasions.

In some embodiments, the one or more time occasions comprise one or more PRS resources. In other embodiments, the one or more time occasions comprise one or more sets of PRS resources.

In some embodiments, the signaling includes a bitmap comprising bits that are respectively associated with time occasions, wherein values of the bits respectively indicate whether the associated time occasions are reserved for PRS transmission or are time occasions in which the wireless communication device is to perform PRS measurement. In one embodiment, for example, the signaling indicates a granularity of the bitmap so as to indicate a duration of each of the time occasions. Alternatively or additionally, the signaling indicates whether or not reservation of the one or more time occasions for PRS transmission will recur according to the bitmap.

In some embodiments, the signaling indicates a time at which the one or more time occasions start.

In some embodiments, the one or more time occasions are one or more consecutive time occasions.

In some embodiments, the one or more time occasions are included in a time window within which PRS transmission by the radio network node is guaranteed.

In some embodiments, the one or more time occasions are included in a minimum time window within which PRS transmission by the radio network node is guaranteed.

FIG. 6B depicts a method performed by a wireless communication device configured for use in a wireless communication network 10 in accordance with other particular embodiments. The method includes receiving, from a radio network node 14, information about a starting time instance for performing gapless positioning reference signal, PRS, measurements (Block 650). In some embodiments, the method further comprises using the received information for performing gapless PRS measurements (Block 660).

In some embodiments, the information expresses the starting time instance in terms of a system frame number, a subframe number, and a slot number.

In some embodiments, the information about the starting time instance for performing gapless PRS measurements is information about a starting time instance of a time window within which PRS transmission by the radio network node 14 is guaranteed.

Embodiments herein also include corresponding apparatuses. Embodiments herein for instance include a wireless communication device 12 configured to perform any of the steps of any of the embodiments described above for the wireless communication device 12.

Embodiments also include a wireless communication device 12 comprising processing circuitry and power supply circuitry. The processing circuitry is configured to perform any of the steps of any of the embodiments described above for the wireless communication device 12. The power supply circuitry is configured to supply power to the wireless communication device 12.

Embodiments further include a wireless communication device 12 comprising processing circuitry. The processing circuitry is configured to perform any of the steps of any of the embodiments described above for the wireless communication device 12. In some embodiments, the wireless communication device 12 further comprises communication circuitry.

Embodiments further include a wireless communication device 12 comprising processing circuitry and memory. The memory contains instructions executable by the processing circuitry whereby the wireless communication device 12 is configured to perform any of the steps of any of the embodiments described above for the wireless communication device 12.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless communication device 12. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 14 configured to perform any of the steps of any of the embodiments described above for the radio network node 14.

Embodiments also include a radio network node 14 comprising processing circuitry and power supply circuitry. The processing circuitry is configured to perform any of the steps of any of the embodiments described above for the radio network node 14. The power supply circuitry is configured to supply power to the radio network node 14.

Embodiments further include a radio network node 14 comprising processing circuitry. The processing circuitry is configured to perform any of the steps of any of the embodiments described above for the radio network node 14. In some embodiments, the radio network node 14 further comprises communication circuitry.

Embodiments further include a radio network node 14 comprising processing circuitry and memory. The memory contains instructions executable by the processing circuitry whereby the radio network node 14 is configured to perform any of the steps of any of the embodiments described above for the radio network node 14.

Embodiments also include a location server 20 comprising processing circuitry and power supply circuitry. The processing circuitry is configured to perform any of the steps of any of the embodiments described above for the location server 20. The power supply circuitry is configured to supply power to the location server 20.

Embodiments further include a location server 20 comprising processing circuitry. The processing circuitry is configured to perform any of the steps of any of the embodiments described above for the location server 20. In some embodiments, the location server 20 further comprises communication circuitry.

Embodiments further include a location server 20 comprising processing circuitry and memory. The memory contains instructions executable by the processing circuitry whereby the location server 20 is configured to perform any of the steps of any of the embodiments described above for the location server 20.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 7:
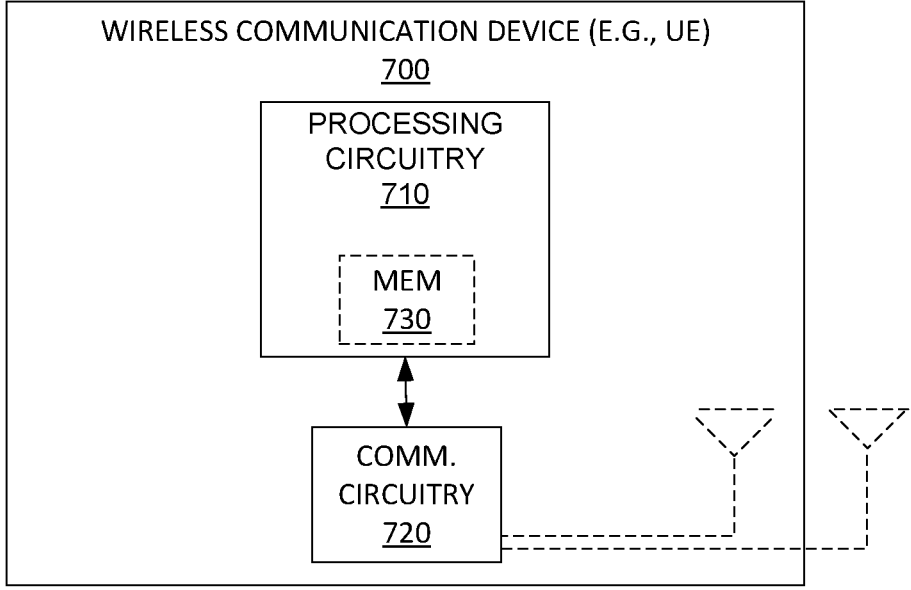
FIG. 7 is a block diagram of a wireless communication device according to some embodiments.

FIG. 7 for example illustrates a wireless communication device 700 as implemented in accordance with one or more embodiments. As shown, the wireless communication device 700 includes processing circuitry 710 and communication circuitry 720. The communication circuitry 720 (e.g., radio circuitry) is configured to transmit and/or receive information to and/or from one or more other nodes, e.g., via any communication technology. Such communication may occur via one or more antennas that are either internal or external to the wireless device 700. The processing circuitry 710 is configured to perform processing described above, e.g., in FIG. 6A and/or FIG. 6B, such as by executing instructions stored in memory 730. The processing circuitry 710 in this regard may implement certain functional means, units, or modules.

Figure 8:
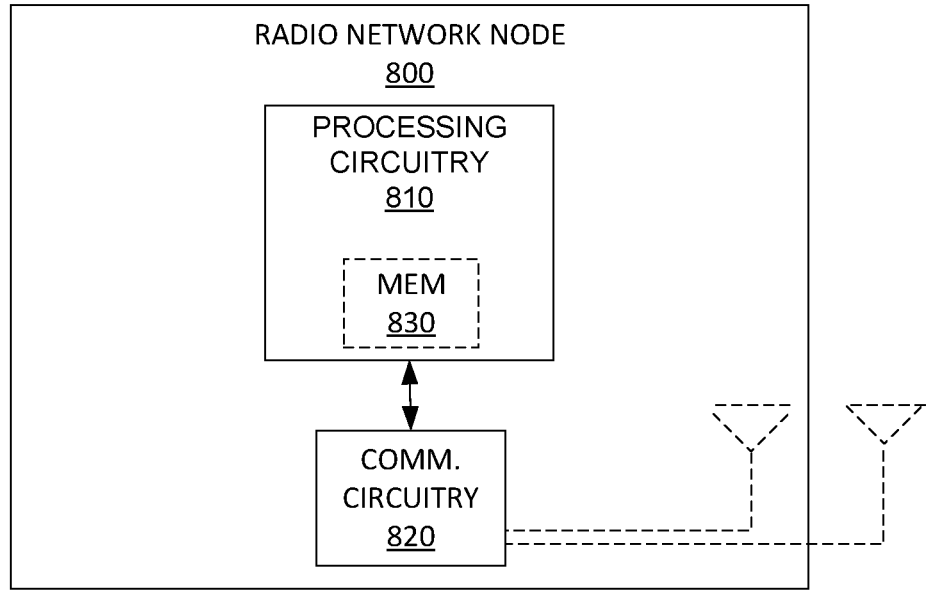
FIG. 8 is a block diagram of a radio network node according to some embodiments.

FIG. 8 illustrates a radio network node 800 as implemented in accordance with one or more embodiments. As shown, the radio network node 800 includes processing circuitry 810 and communication circuitry 820. The communication circuitry 820 is configured to transmit and/or receive information to and/or from one or more other nodes, e.g., via any communication technology. The processing circuitry 810 is configured to perform processing described above, e.g., in FIG. 4, such as by executing instructions stored in memory 830. The processing circuitry 810 in this regard may implement certain functional means, units, or modules.

Figure 9:
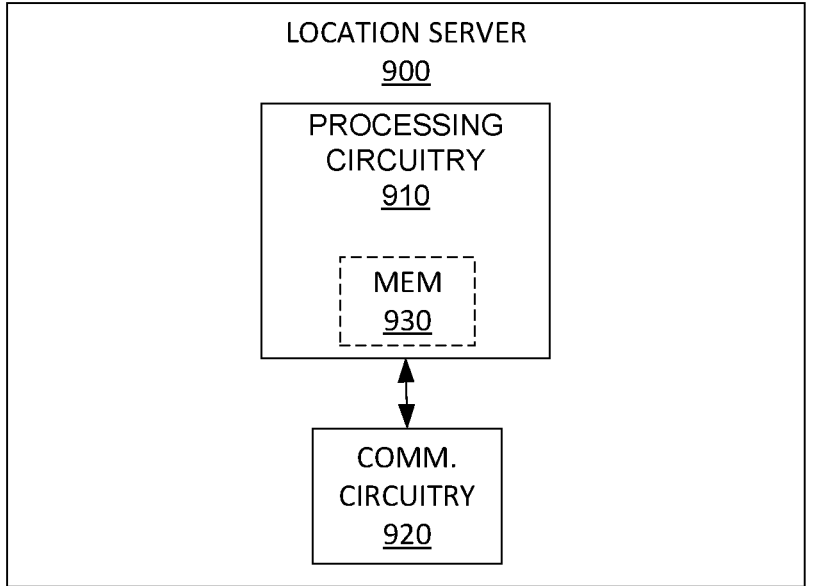
FIG. 9 is a block diagram of a location server according to some embodiments.

FIG. 9 illustrates a location server 900 as implemented in accordance with one or more embodiments. As shown, the location server 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 5, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

As used herein, examples of network nodes are NodeB, base station (BS), multi-standard radio (MSR) radio node such as MSR BS, eNodeB, gNodeB, master eNB (MeNB), secondary eNB (SeNB), location measurement unit (LMU), integrated access backhaul (IAB) node, network controller, radio network controller (RNC), base station controller (BSC), relay, donor node controlling relay, base transceiver station (BTS), Central Unit (e.g., in a gNB), Distributed Unit (e.g., in a gNB), Baseband Unit, Centralized Baseband, C-RAN, access point (AP), transmission points, transmission nodes, transmission reception point (TRP), remote radio unit (RRU), remote radio head (RRH), nodes in distributed antenna system (DAS), core network node (e.g., mobile switching center (MSC), mobility management entity (MME), etc), operations and maintenance (O&M), Operations Support System (OSS), Self-Optimizing Network (SON), positioning server (e.g., E-SMLC), etc.

The non-limiting term UE refers to any type of wireless device communicating with a network node and/or with another UE in a cellular or mobile communication system. Examples of UE are target device, device to device (D2D) UE, vehicular to vehicular (V2V), machine type UE, MTC UE or UE capable of machine to machine (M2M) communication, PDA, tablet, mobile terminals, smart phone, laptop embedded equipment (LEE), laptop mounted equipment (LME), USB dongles, etc.

The term signal or radio signal used herein can be any physical signal or physical channel. Examples of DL physical signals are reference signals such as Primary Synchronization Signal (PSS), Secondary Synchronization Signal (SSS), Channel State Information RS (CSI-RS), Demodulation RS (DMRS), signals in Synchronization Signal Block (SSB), Discovery Reference Signal (DRS), Cell-specific RS (CRS), PRS, etc. Examples of UL physical signals are reference signals such as SRS, DMRS, etc. The term physical channel refers to any channel carrying higher layer information, e.g., data, control, etc. Examples of physical channels are Physical Broadcast Channel (PBCH), Narrowband PBCH (NPBCH), Physical Downlink Control Channel (PDCCH), Physical Downlink Shared Channel (PDSCH), short Physical Uplink Control Channel (sPUCCH), short PDSCH (sPDSCH), short PUCCH (sPUCCH), short PUSCH (sPUSCH), MTC PDCCH (MPDCCH), Narrowband PDCCH (NPDCCH), Narrowband PDSCH (NPDSCH), Evolved PDCCH (E-PDCCH), Physical Uplink Shared Channel (PUSCH), Physical Uplink Control Channel (PUCCH), Narrowband PUSCH (NPUSCH), etc.

The term time resource used herein may correspond to any type of physical resource or radio resource expressed in terms of length of time. Examples of time resources are: symbol, time slot, subframe, radio frame, TTI, interleaving time, slot, sub-slot, mini-slot, etc.

Figure 10:
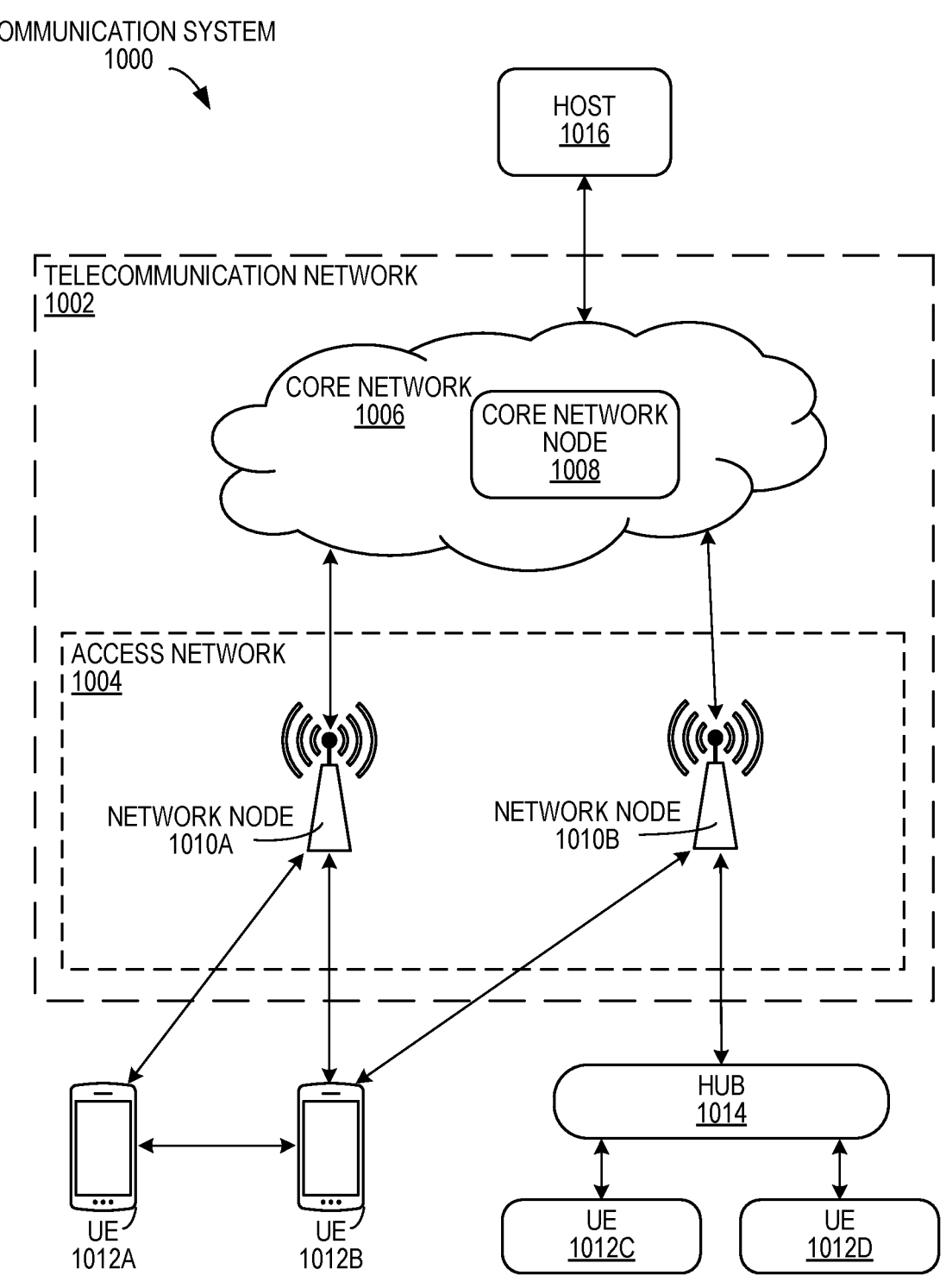
FIG. 10 is a block diagram of a communication system in accordance with some embodiments.

FIG. 10 shows an example of a communication system 1000 in accordance with some embodiments.

In the example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010a and 1010b (one or more of which may be generally referred to as network nodes 1010), or any other similar 3$^{rd}$ Generation Partnership Project (3GPP) access node or non-3GPP access point. The network nodes 1010 facilitate direct or indirect connection of user equipment (UE), such as by connecting UEs 1012a, 1012b, 1012c, and 1012d (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio—Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

Figure 11:
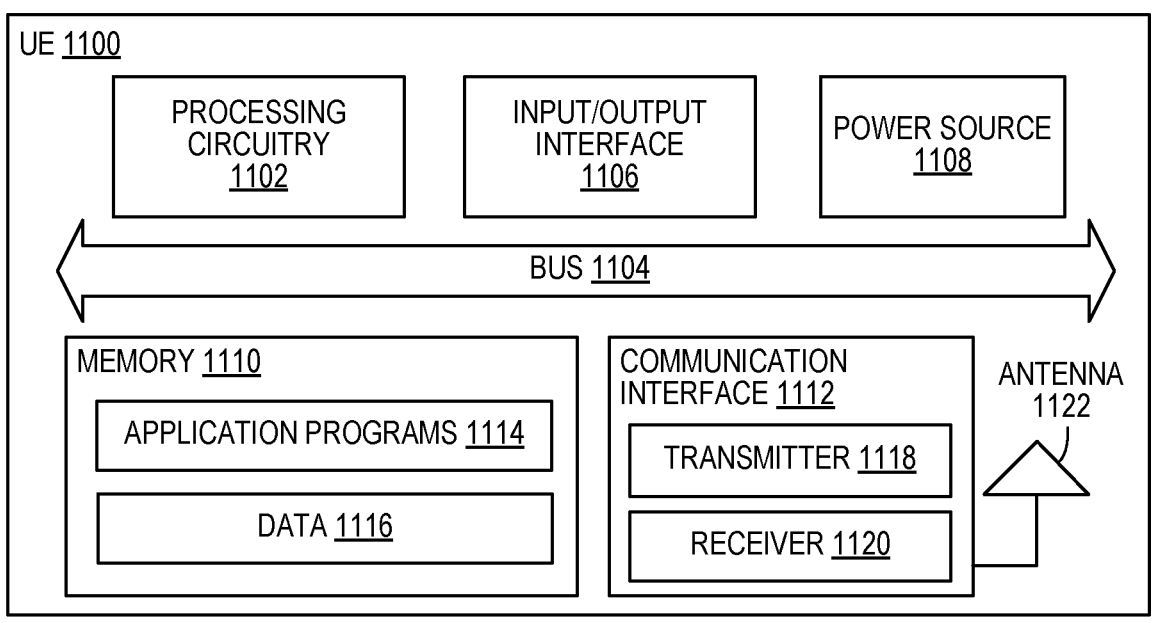
FIG. 11 is a block diagram of a user equipment according to some embodiments.

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-loT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
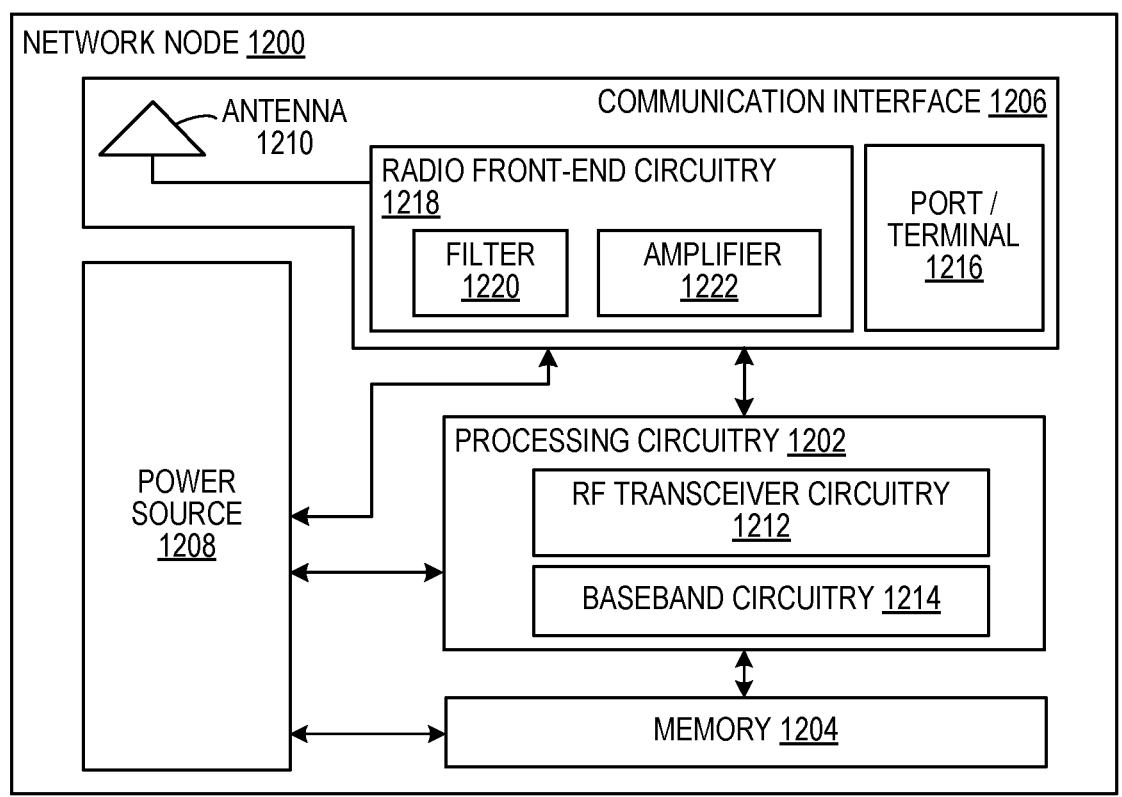
FIG. 12 is a block diagram of a network node according to some embodiments.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS)

nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
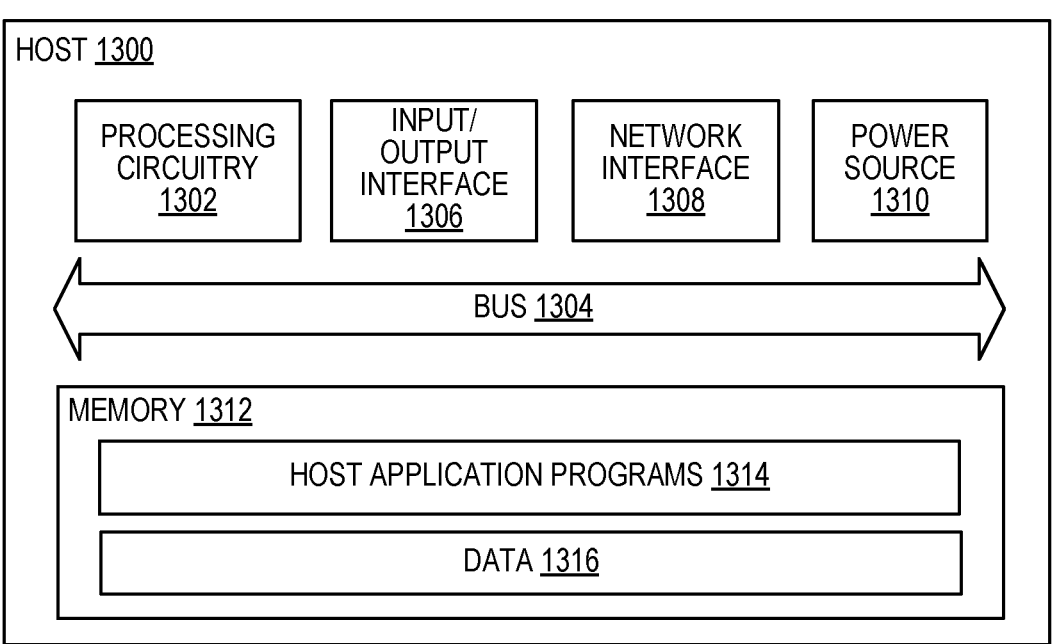
FIG. 13 is a block diagram of a host according to some embodiments.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real- Time Messaging Protocol (RTMP), Real-Time Streaming Protocol (RTSP), Dynamic Adaptive Streaming over HTTP (MPEG-DASH), etc.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408*a* and 1408*b* (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g. such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012*a* of FIG. 10 and/or UE 1100 of FIG. 11), network node (such as network node 1010*a* of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above, or supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Example embodiments of the techniques and apparatus described herein include, but are not limited to, the following enumerated examples:

Embodiment 1. A method performed by a radio network node configured for use in a wireless communication network, the method comprising:
  transmitting, to a location server, signaling indicating one or more time occasions reserved by the radio network node for positioning reference signal, PRS, transmission.

Embodiment 2. The method of embodiment 1, further comprising reserving the one or more time occasions for PRS transmission, wherein the signaling indicates the one or more time occasions reserved.

Embodiment 3. The method of any of embodiments 1-2, further comprising receiving, from the location server, a request for the radio network node to reserve one or more time occasions for PRS transmission, and wherein the signaling is transmitted responsive to or based on the request.

Embodiment 4. The method of embodiment 3, wherein at least one of the one or more time occasions indicated as reserved by the signaling is the same as at least one of the one or more time occasions requested by the location server to be reserved.

Embodiment 5. The method of any of embodiments 3-4, wherein the signaling indicates one or more time occasions reserved by the radio network node for PRS transmission by indicating acceptance of the request.

Embodiment 6. The method of any of embodiments 1-5, further comprising refraining from scheduling any transmission other than PRS transmission in the one or more time occasions indicated as reserved for PRS transmission, or dropping any transmission other than PRS transmission scheduled for transmission in the one or more time occasions indicated as reserved for PRS transmission.

Embodiment 7. The method of any of embodiments 1-6, further comprising performing PRS transmission in the one or more time occasions indicated.

Embodiment 8. The method of any of embodiments 1-7, further comprising, after transmitting the signaling, receiving, from the location server, an indication of one or more common time occasions that are commonly reserved by multiple radio network nodes for PRS transmission.

Embodiment 9. The method of embodiment 8, wherein the one or more common time occasions are included in a common guaranteed PRS measurement window.

Embodiment 10. The method of any of embodiments 8-9, further comprising refraining from scheduling any transmission other than PRS transmission in the one or more common time occasions, or dropping any trans-
mission other than PRS transmission scheduled for transmission in the one or more common time occasions.

Embodiment 11. The method of any of embodiments 8-10, further comprising performing PRS transmission in the one or more common time occasions.

Embodiment 12. A method performed by a location server configured for use in a wireless communication network, the method comprising:
  receiving, from a radio network node, signaling indicating one or more time occasions reserved by the radio network node for positioning reference signal, PRS, transmission.

Embodiment 13. The method of embodiment 12, further comprising transmitting, from the location server to the radio network node, a request for the radio network node to reserve one or more time occasions for PRS transmission, and wherein the signaling is received responsive to or based on the request.

Embodiment 14. The method of embodiment 13, wherein at least one of the one or more time occasions indicated as reserved by the signaling is the same as at least one of the one or more time occasions requested by the location server to be reserved.

Embodiment 15. The method of any of embodiments 13-14, wherein the signaling indicates one or more time occasions reserved by the radio network node for PRS transmission by indicating acceptance of the request.

Embodiment 16. The method of any of embodiments 12-15, further comprising, after receiving the signaling, transmitting, from the location server to the radio network node, an indication of one or more common time occasions that are commonly reserved by multiple radio network nodes for PRS transmission.

Embodiment 17. The method of embodiment 16, wherein the one or more common time occasions are included in a common guaranteed PRS measurement window.

Embodiment 18. The method of any of embodiments 16-18, further comprising determining the one or more common time occasions based on signaling received from the multiple radio network nodes indicating one or more time occasions respectively reserved by the multiple radio network nodes for PRS transmission.

Embodiment 19. The method of any of embodiments 1-18, wherein the signaling indicates one or more time occasions unconditionally reserved by the radio network node for PRS transmission, such that PRS transmission in the one or more time occasions is guaranteed.

Embodiment 20. The method of any of embodiments 1-18, wherein the signaling indicates one or more time occasions reserved by the radio network node for PRS transmission subject to PRS transmission having at least as high of priority as any other transmissions contending for transmission in the one or more time occasions.

Embodiment 21. The method of any of embodiments 1-20, wherein the signaling indicates a priority of PRS transmission.

Embodiment 22. The method of any of embodiments 1-21, wherein the signaling indicates PRS transmission has a priority that is at least as high as a downlink data channel transmission.

Embodiment 23. The method of any of embodiments 1-22, wherein the one or more time occasions comprise one or more PRS resources.

Embodiment 24. The method of any of embodiments 1-22, wherein the one or more time occasions comprise one or more sets of PRS resources.

Embodiment 25. The method of any of embodiments 1-24, wherein the signaling includes a bitmap comprising bits that are respectively associated with time occasions, wherein values of the bits respectively indicate whether the associated time occasions are reserved for PRS transmission.

Embodiment 26. The method of embodiment 25, wherein the signaling indicates a granularity of the bitmap so as to indicate a duration of each of the time occasions.

Embodiment 27. The method of any of embodiments 25-26, wherein the signaling indicates whether or not reservation of the one or more time occasions for PRS transmission will recur according to the bitmap.

Embodiment 28. The method of any of embodiments 1-27, wherein the signaling indicates a time at which the one or more time occasions start.

Embodiment 29. The method of any of embodiments 1-28, wherein the one or more time occasions are one or more consecutive time occasions.

Embodiment 30. The method of any of embodiments 1-29, wherein the one or more time occasions are included in a time window within which PRS transmission by the radio network node is guaranteed.

Embodiment 31. The method of any of embodiments 1-29, wherein the one or more time occasions are included in a minimum time window within which PRS transmission by the radio network node is guaranteed.

Embodiment 32. The method of any of embodiments 1-31, wherein the signaling indicates, for each of one or more transmission reception points, one or more time occasions reserved by the radio network node for positioning reference signal, PRS, transmission from that transmission reception point.

Embodiment 33. The method of any of embodiments 1-32, further comprising, based on the signaling, avoiding scheduling PRS measurements during a downlink priority data occasion.

Embodiment 34. The method of any of embodiments 1-32, further comprising, based on the signaling, avoiding scheduling gapless PRS measurements during a downlink priority data occasion.

Embodiment 35. A method performed by a wireless communication device configured for use in a wireless communication network, the method comprising:

receiving, from a location server, signaling indicating one or more time occasions, wherein the one or more time occasions are:

one or more time occasions in which the wireless communication device is to perform positioning reference signal, PRS, measurement; and/or reserved by the radio network node for PRS transmission.

Embodiment 36. The method of embodiment 35, further comprising performing PRS measurement on PRS received in the one or more time occasions indicated.

Embodiment 37. The method of any of embodiments 35-36, wherein the signaling indicates one or more time occasions unconditionally reserved by the radio network node for PRS transmission, such that PRS transmission in the one or more time occasions is guaranteed.

Embodiment 38. The method of any of embodiments 35-37, wherein the signaling indicates one or more time occasions reserved by the radio network node for PRS transmission subject to PRS transmission having at least as high of priority as any other transmissions contending for transmission in the one or more time occasions.

Embodiment 39. The method of any of embodiments 35-38, wherein the one or more time occasions comprise one or more PRS resources.

Embodiment 40. The method of any of embodiments 35-38, wherein the one or more time occasions comprise one or more sets of PRS resources.

Embodiment 41. The method of any of embodiments 35-40, wherein the signaling includes a bitmap comprising bits that are respectively associated with time occasions, wherein values of the bits respectively indicate whether the associated time occasions are reserved for PRS transmission or are time occasions in which the wireless communication device is to perform PRS measurement.

Embodiment 42. The method of embodiment 40, wherein the signaling indicates a granularity of the bitmap so as to indicate a duration of each of the time occasions.

Embodiment 43. The method of any of embodiments 41-42, wherein the signaling indicates whether or not reservation of the one or more time occasions for PRS transmission will recur according to the bitmap.

Embodiment 44. The method of any of embodiments 35-43, wherein the signaling indicates a time at which the one or more time occasions start.

Embodiment 45. The method of any of embodiments 35-44, wherein the one or more time occasions are one or more consecutive time occasions.

Embodiment 46. The method of any of embodiments 35-45, wherein the one or more time occasions are included in a time window within which PRS transmission by the radio network node is guaranteed.

Embodiment 47. The method of any of embodiments 35-46, wherein the one or more time occasions are included in a minimum time window within which PRS transmission by the radio network node is guaranteed.

Embodiment 48. A radio network node configured for use in a wireless communication network, the radio network node configured to:

transmit, to a location server, signaling indicating one or more time occasions reserved by the radio network node for positioning reference signal, PRS, transmission.

Embodiment 49. The radio network node of embodiment 48, configured to perform the method of any of embodiments 2-11 and 19-34.

Embodiment 50. A location server configured for use in a wireless communication network, the location server configured to:

receive, from a radio network node, signaling indicating one or more time occasions reserved by the radio network node for positioning reference signal, PRS, transmission.

Embodiment 51. The location server of embodiment 50, configured to perform the method of any of embodiments 13-34.

Embodiment 52. A wireless communication device configured for use in a wireless communication network, the wireless communication device configured to:

receive, from a location server, signaling indicating one or more time occasions, wherein the one or more time occasions are:

one or more time occasions in which the wireless communication device is to perform positioning reference signal, PRS, measurement; and/or reserved by the radio network node for PRS transmission.

Embodiment 53. The wireless communication device of embodiment 52, configured to perform the method of any of embodiments 36-47.

Embodiment 54. A computer program comprising instructions which, when executed by at least one processor of a radio network node, causes the radio network node to perform the method of any of embodiments 1-11 and 19-34.

Embodiment 55. A computer program comprising instructions which, when executed by at least one processor of a location server, causes the location server to perform the method of any of embodiments 12-34.

Embodiment 56. A computer program comprising instructions which, when executed by at least one processor of a wireless communication device, causes the wireless communication device to perform the method of any of embodiments 35-47.

Embodiment 57. A carrier containing the computer program of any of embodiments 54-56, wherein the carrier is one of an electronic signal, optical signal, radio signal, or computer readable storage medium.

What is claimed is:

1. A method performed by a radio network node configured for use in a wireless communication network, the method comprising:

receiving, from a network node, a request for the radio network node to reserve one or more time occasions for positioning reference signal (PRS) transmission; and responsive to or based on the request, transmitting, to the network node, signaling indicating one or more time occasions reserved by the radio network node for PRS transmission, wherein at least one of the one or more time occasions indicated as reserved by the signaling is the same as at least one of the one or more time occasions requested by the network node to be reserved, wherein the signaling indicates one or more time occasions reserved by the radio network node for PRS transmission by indicating acceptance of the request.

2. The method of claim 1, further comprising:

reserving the one or more time occasions for PRS transmission, wherein the signaling indicates the one or more time occasions reserved; and performing PRS transmission in the one or more time occasions indicated.

3. The method of claim 1, further comprising refraining from scheduling any transmission other than PRS transmission in the one or more time occasions indicated as reserved for PRS transmission, or dropping any transmission other than PRS transmission scheduled for transmission in the one or more time occasions indicated as reserved for PRS transmission.

4. The method of claim 1, further comprising:

after transmitting the signaling, receiving, from the network node, an indication of one or more common time occasions that are commonly reserved by multiple radio network nodes for PRS transmission;

refraining from scheduling any transmission other than PRS transmission in the one or more common time occasions, or dropping any transmission other than PRS transmission scheduled for transmission in the one or more common time occasions; and performing PRS transmission in the one or more common time occasions.

5. The method of claim 1, wherein the signaling indicates:

one or more time occasions unconditionally reserved by the radio network node for PRS transmission, such that PRS transmission in the one or more time occasions is guaranteed; or one or more time occasions reserved by the radio network node for PRS transmission subject to PRS transmission having at least as high of priority as any other transmissions contending for transmission in the one or more time occasions.

6. The method of claim 1, wherein the one or more time occasions are included in a time window within which PRS transmission by the radio network node is guaranteed or are included in a minimum time window within which PRS transmission by the radio network node is guaranteed.

7. The method of claim 1, wherein the network node is a location server.

8. The method of claim 1, wherein a split radio network node comprises a distributed unit and a central unit, wherein the radio network node implements the distributed unit and wherein the network node implements the central unit.

9. A radio network node configured for use in a wireless communication network, the radio network node comprising:

communication circuitry; and processing circuitry configured to:

receive, from a network node, a request for the radio network node to reserve one or more time occasions for positioning reference signal (PRS) transmission; and responsive to or based on the request, transmit, to the network node, via the communication circuitry, signaling indicating one or more time occasions reserved by the radio network node for PRS transmission, wherein at least one of the one or more time occasions indicated as reserved by the signaling is the same as at least one of the one or more time occasions requested by the network node to be reserved, wherein the signaling indicates one or more time occasions reserved by the radio network node for PRS transmission by indicating acceptance of the request.

10. The radio network node of claim 9, the processing circuitry further configured to:

reserve the one or more time occasions for PRS transmission, wherein the signaling indicates the one or more time occasions reserved; and perform PRS transmission in the one or more time occasions indicated.

11. The radio network node of claim 9, the processing circuitry further configured to refrain from scheduling any transmission other than PRS transmission in the one or more time occasions indicated as reserved for PRS transmission, or drop any transmission other than PRS transmission scheduled for transmission in the one or more time occasions indicated as reserved for PRS transmission.

12. The radio network node of claim 9, the processing circuitry further configured to:

after transmitting the signaling, receive, from the network node, an indication of one or more common time occasions that are commonly reserved by multiple radio network nodes for PRS transmission;

refrain from scheduling any transmission other than PRS transmission in the one or more common time occasions, or drop any transmission other than PRS transmission scheduled for transmission in the one or more common time occasions; and perform PRS transmission in the one or more common time occasions.

13. The radio network node of claim 9, wherein the signaling indicates:

one or more time occasions unconditionally reserved by the radio network node for PRS transmission, such that PRS transmission in the one or more time occasions is guaranteed; or one or more time occasions reserved by the radio network node for PRS transmission subject to PRS transmission having at least as high of priority as any other transmissions contending for transmission in the one or more time occasions.

14. The radio network node of claim 9, wherein the one or more time occasions are included in a time window within which PRS transmission by the radio network node is guaranteed or are included in a minimum time window within which PRS transmission by the radio network node is guaranteed.

15. The radio network node of claim 9, wherein the network node is a location server.

16. The radio network node of claim 9, wherein a split radio network node comprises a distributed unit and a central unit, wherein the radio network node implements the distributed unit and wherein the network node implements the central unit.

* * * * *